(12) United States Patent
Ito et al.

(10) Patent No.: US 7,252,568 B2
(45) Date of Patent: Aug. 7, 2007

(54) OUTBOARD MOTOR

(75) Inventors: Yu Ito, Shizuoka-ken (JP); Mitsuru Nagashima, Shizuoka-ken (JP); Noriyoshi Hiraoka, Shizuoka-ken (JP); Masanori Takahashi, Shizuoka-ken (JP)

(73) Assignee: Yamaha Marine Kabushiki Kaisha (JP)

( * ) Notice: Subject to any disclaimer, the term of this patent is extended or adjusted under 35 U.S.C. 154(b) by 0 days.

(21) Appl. No.: 11/314,924

(22) Filed: Dec. 20, 2005

(65) Prior Publication Data

US 2006/0135008 A1 Jun. 22, 2006

(30) Foreign Application Priority Data

Dec. 20, 2004 (JP) ............................. 2004-367928

(51) Int. Cl.
*B63H 20/32* (2006.01)
(52) U.S. Cl. ....................................... 440/77; 440/88 A
(58) Field of Classification Search .................. 440/76, 440/77, 78, 88 R
See application file for complete search history.

(56) References Cited

U.S. PATENT DOCUMENTS

| | | | | |
|---|---|---|---|---|
| 3,610,198 A * | 10/1971 | Alexandrowicz | ............ | 440/77 |
| 4,379,702 A * | 4/1983 | Takada et al. | ................. | 440/77 |
| 4,403,971 A * | 9/1983 | Kobayashi et al. | ........ | 440/88 R |
| 4,734,070 A * | 3/1988 | Mondek | .................... | 440/88 R |
| 4,978,321 A | 12/1990 | Ferguson | | |
| 5,445,547 A * | 8/1995 | Furukawa | ..................... | 440/77 |
| 6,099,372 A * | 8/2000 | Toyama | ....................... | 440/77 |

FOREIGN PATENT DOCUMENTS

| JP | 55-083696 | 6/1980 |
|---|---|---|
| JP | 61-12898 | 1/1986 |
| JP | 61-4718 | 2/1986 |

* cited by examiner

*Primary Examiner*—Lars A. Olson
(74) *Attorney, Agent, or Firm*—Knobbe, Martens, Olson & Bear, LLP

(57) ABSTRACT

An outboard motor comprises a cowling, having a top cowling and a bottom cowling, that cooperate to define an engine compartment. An intake air duct draws outside air into the engine compartment. A water collecting part is arranged in the bottom cowling for accumulating water that may enter the cowling through the air duct. A water passage may also be provided for guiding water from the intake air duct to the water collecting part. The water passage may have air openings for allowing air to enter the engine compartment independent of the water. A floor of the engine compartment may be adapted to contain water splashing and direct water to a water collecting part.

22 Claims, 23 Drawing Sheets

OUTBOARD MOTOR

CROSS-REFERENCE TO RELATED APPLICATIONS

This application claims priority to Japanese application No. 2004-367928, which was filed on Dec. 20, 2004, the entirety of which is hereby incorporated by reference.

BACKGROUND OF THE INVENTION

1. Field of the Invention

The present invention relates to an outboard motor. More specifically, the present invention relates to an outboard motor having a system for minimizing the possibility that water will impinge on an internal combustion engine of the outboard motor and/or enter the engine air intake system.

2. Description of the Related Art

Conventionally, an outboard motor comprises an internal combustion engine enclosed in an engine compartment defined by a cowling comprising a top cowling and a bottom cowling. An intake air duct is formed through the cowling for supplying air to the engine. The cowling air duct is generally provided with a water-separating structure for preventing the entrance of water from outside the cowling. The air duct preferably has a cross sectional area large enough to secure an adequate amount of intake air. Therefore, it may be difficult to keep water from entering and flowing through the intake duct.

Water entering the cowling typically contacts the top face of a flywheel magneto cover. From the flywheel cover, water flows or drips to the bottom of the cowling. Possibly, water may drip onto the engine from the flywheel equipment cover, or water accumulated in the bottom of the cowling may scatter onto the engine or auxiliary due to vibration or trimming, turning tilting motion of the outboard motor. Also, there is a possibility that water is ingested by the engine via its air intake system.

In one known technique, water accumulated in the bottom of the cowling is drained by means of a check valve. This technique does not work until a sufficient amount of water is accumulated to push open the check valve. In addition, it may take a long time to drain the water completely.

Technology also exists to prevent water that enters a cowling from dripping directly on an engine. However, since the water accumulates in the bottom cowling before it is drained, it can scatter and splash onto the engine prior to being drained due to vibrations and/or motion of the motor due to wave action.

In other art, a water drain outlet on the top cowling faces rearward and has a cover. This structure is especially susceptible to water intrusion, especially is a large wave contacts the outboard motor. In addition, there is a chance that water will flow back from the drain outlet into the outboard motor.

Large outboard motors with high power output typically require large quantities of intake air for engine operation. Thus, a cross-section of an intake air duct is typically relatively large for such motors in order to assure a sufficient amount of air is provided to the engine. As such, water intrusion prevention techniques are typically less effective for such motors, and problems in connection with accumulation of water in the bottom of cowlings are particularly relevant in large, high power outboard motors.

SUMMARY OF THE INVENTION

Accordingly, a need exist for an outboard motor having a structure in which water entering the cowling is prevented from scattering and splashing around the engine compartment. A need also exists for a structure that prevents water that enters the cowling from splashing directly onto the engine.

In accordance with one embodiment, an outboard motor is provided comprising a cowling generally enclosing an engine. The cowling comprises an upper cowling and a lower cowling that engage one another and define an engine compartment therewithin. The upper cowling has an intake assembly defining an intake chamber. An intake aperture is formed through the upper cowling and opens into the intake chamber. An air duct opens from the intake chamber into the engine compartment so that intake air is drawn through the intake aperture into the intake chamber and then through the air duct to the engine compartment. A water collector is disposed in the lower cowling. The water collector has an opening and is adapted to accumulate water from within the engine compartment.

In accordance with another embodiment, the water collector comprises a ceiling portion adapted to prevent water from splashing out of the water collector during motor operation. In further embodiments, the outboard motor additionally comprises a passage adapted to direct water and air from the air duct opening toward the water collector opening. Preferably the passage comprises an air outlet adapted to allow air to flow from the passage into the engine compartment.

In accordance with a still further embodiment, the invention provides an outboard motor comprising a cowling generally enclosing an engine. The cowling comprises an upper cowling member and a lower cowling member that engage one another and define an engine compartment. The upper cowling member has an air intake assembly adapted to direct air from outside the cowling into the engine compartment. The lower cowling member comprises means for holding water that may enter the engine compartment. The outboard motor additionally comprises means for directing water from the air intake system toward the water holding means.

DETAILED DESCRIPTION OF PREFERRED EMBODIMENTS

Embodiments of outboard motors showing aspects of the present invention are now described. Of course, the present invention is not limited to the disclosed embodiments.

Figure 1:
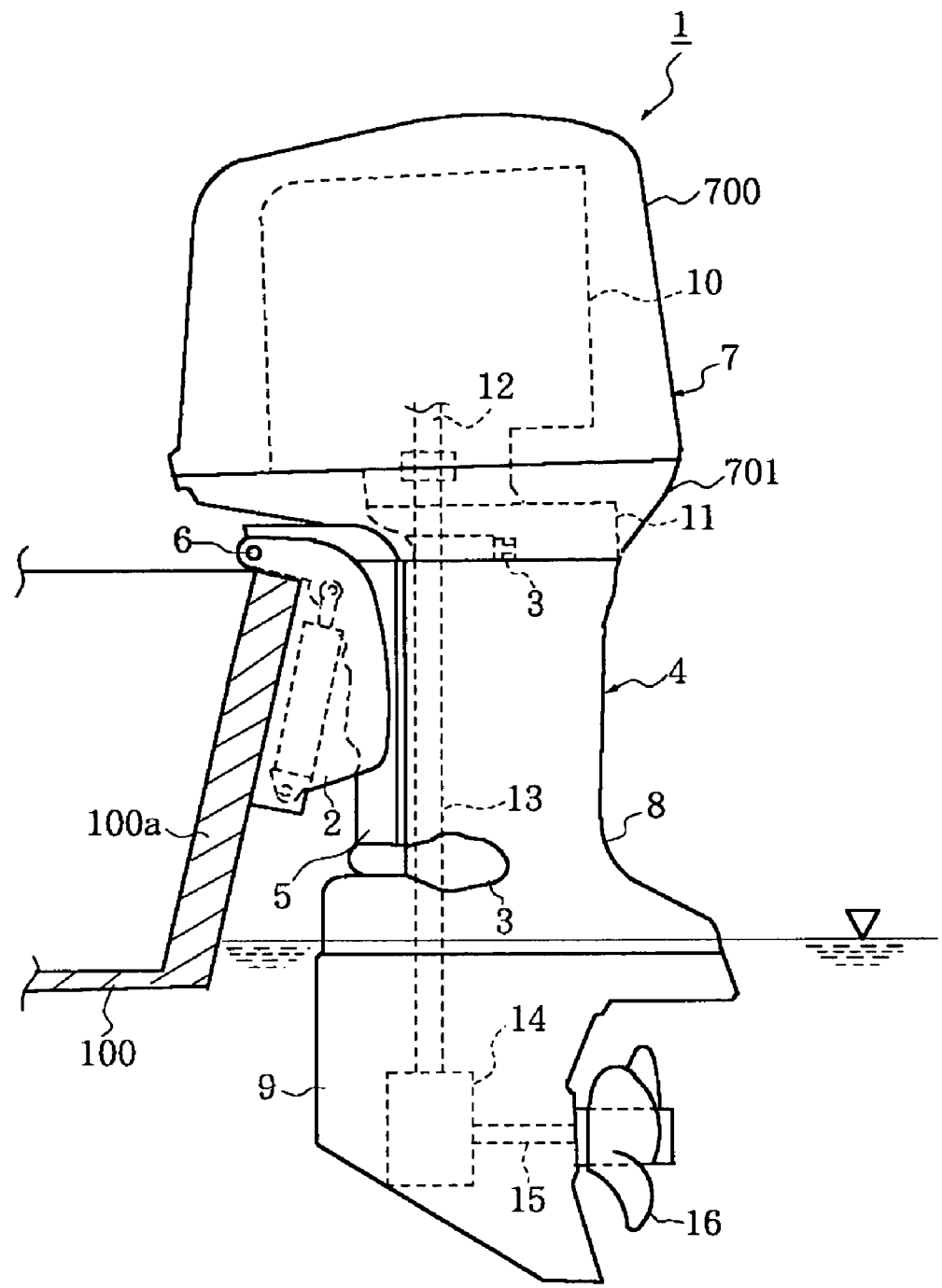
FIG. 1 is a side view of an embodiment of an outboard motor mounted on a hull.

FIG. 1 is a side view of an outboard motor mounted on a hull. An outboard motor 1 according to this embodiment is attached to a transom board 100a of the hull 100 by means of a clamp bracket 2. A swivel bracket 5, elastically supporting a propulsion unit 4 by means of upper and lower damper members 3, is attached to the clamp bracket 2 by a tilt shaft 6 in the manner that the swivel bracket 5 can pivot about the tilt shaft 6 in the up-and-down direction.

The propulsion unit 4 has a housing composed of a cowling 7, an upper case 8, and a lower case 9. The cowling 7 has a top cowling 700 and a bottom cowling 701. The top cowling 700 is detachably mounted on the bottom cowling 701.

The cowling 7 preferably contains a four-cycle engine 10. The upper case 8 is attached to the bottom of an exhaust guide 11. The engine 10 is supported by the exhaust guide 11.

A crankshaft 12, disposed vertically in the engine 10, is connected to the upper end of a drive shaft 13, which runs vertically through the inner space of the upper case 8. The lower end of the drive shaft 13 is connected to a forward-reverse shifting mechanism 14 accommodated in the lower case 9. A propeller shaft 15 extends horizontally from the forward-reverse shifting mechanism 14. A propeller 16 is attached to the rear end of the propeller shaft 15, where the propeller shaft 15 sticks out from the lower case 8.

It is to be understood that, although the illustrated propulsion unit is a single propeller system, other types of propulsion units can be used as well. For example, a dual counter-rotational propeller system, jet drive, or the like, may also employ aspects of the present invention.

Figure 2:
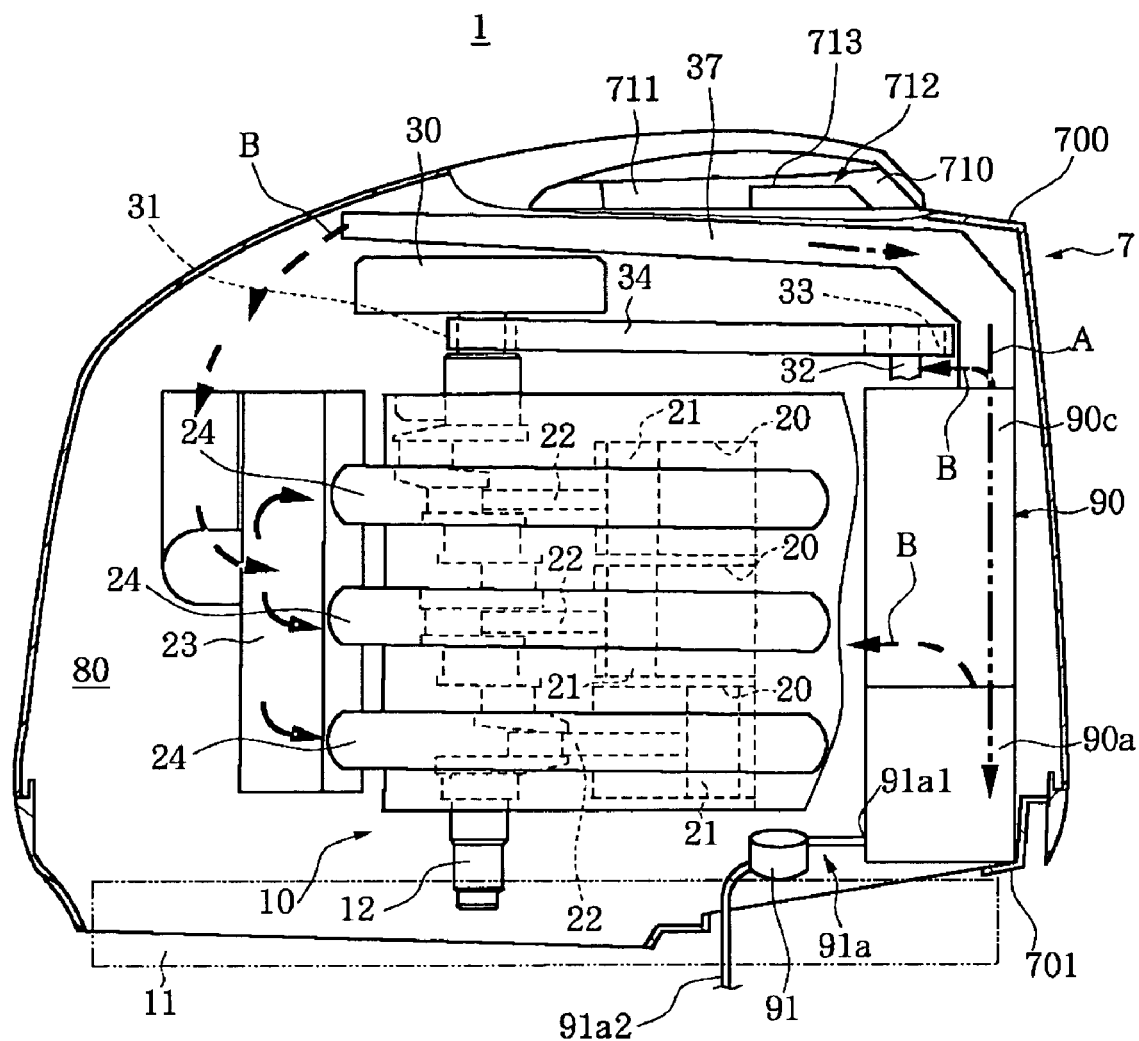
FIG. 2 is a vertical cross-sectional view of an engine of the outboard motor of FIG. 1.
Figure 3:
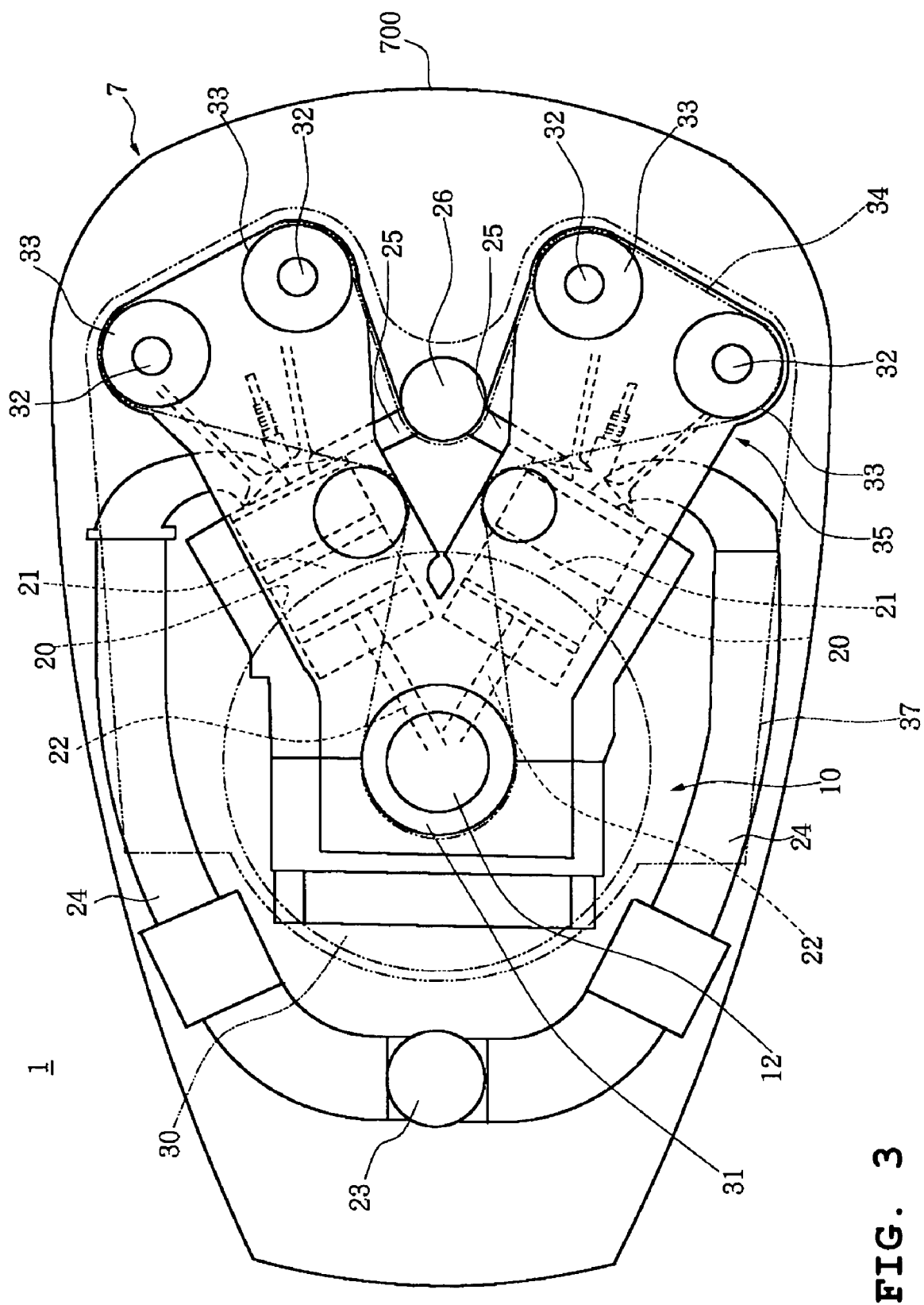
FIG. 3 is a top plan view of the engine of the outboard motor of FIG. 1.

With reference next to FIGS. 2 and 3, in the illustrated embodiment, the engine 10 disposed in the cowling 7 is a V-shaped 6-cylinder four-cycle engine having two banks of cylinders 20 arranged in a V-shape, three cylinders in each bank comprising generally horizontally-disposed upper, middle and lower cylinders lying in parallel. A piston 21 is slidably accommodated in each cylinder 20. The piston 21 is connected to one end of a connecting rod 22, while the other end of the connecting rod 22 is connected to the crankshaft 12.

Although the illustrated outboard motor contemplates a V-type 6-cylinder four-cycle engine, engines having a different number of cylinders, other cylinder arrangements, various cylinder orientations (e.g., upright cylinder banks, etc.), and operating on various combustion principles (e.g., four-stroke, crankcase compression, two-stroke, diesel, and rotary) are all practicable for use with the present invention.

An intake silencer 23 preferably is disposed in front of the engine 10. Intake pipes 24 extend from both sides of the intake silencer 23, and each pipe is connected to a corresponding cylinder. Exhaust pipes 25 are joined to respective cylinders and are gathered into an exhaust manifold 26. The exhaust manifold 26 preferably extends vertically in a space between the V-shaped banks of cylinders for discharging the exhaust gas into water through the exhaust guide 11.

A flywheel magneto 30 preferably is provided at the upper end of the crankshaft 12. Also provided at the upper end of the crankshaft 12 is a driving pulley 31. The driving pulley 31 and driven pulleys 33 of a camshaft 32 provided for each cylinder are bridged by a timing belt 34, to form a valve train 35. The valve train 35 and the magneto 30 preferably are covered with a flywheel magneto cover 37.

The top cowling 700 of the cowling 7 has a fresh air intake opening 710 and an intake air chamber 711, which is a space lying in between the fresh air intake opening 710 and an intake air duct 713. Air drawn through the fresh air intake opening 710 is led toward the engine by way of the intake air chamber 711 and then the intake air duct 713.

According to this embodiment, an air chamber member 712 containing the intake air duct 713 preferably is attached to the inner face of the upper part of the cowling 700a by inserting it from the lower part of the top cowling 700. The intake air chamber 711 is defined between the top cowling 700 and the air chamber member 712.

With reference next to FIGS. 4-7, in the air chamber member 712, the intake air duct 713 is formed at the center of its bottom wall 712a. An intake air chamber front wall 712c is formed in the forward portion of the bottom wall 712a. Also a wall 712d is formed in the rear portion of the bottom wall 712a. The wall 712d is a wall for parting the left and the right fresh air intake openings 710.

In the top plan view, the intake air chamber front wall 712c is shaped so that its center portion 712c1 projects toward the longitudinally rear part of the outboard motor, forming inclined planes 712c2 at both sides of the apex. According to this embodiment, the center portion 712c1 of the intake air chamber front wall 712c projects toward the longitudinally rear part of the outboard motor, generally taking the shape of letter V.

In the illustrated embodiment, the intake air duct 713 is disposed generally behind the intake air chamber front wall 712c along the longitudinal axis of the outboard motor. The intake air duct 713 preferably has a front wall 713a rising from the bottom wall 712a, a rear wall 713b that is longer than the front wall 713a, and the left and the right side walls 713c, 713d connecting the front wall 713a and the rear wall 713b. An air inlet opening 713e is defined by the front wall 713a, rear wall 713b, and the left and the right side walls 713c, 713d. A gap L1 is formed between the upper end of the air inlet opening 713e and the inner face of the upper part of the cowling 700a. Opening of the intake air duct 713 is arranged so that the air is introduced from the intake air chamber 711 toward the engine. The intake air duct 713 is provided generally in the center of the intake air chamber 711.

The presence of the wall 712d of the air intake chamber member 712 allows the fresh air intake openings 710 to be provided separately on both sides of the wall 712d. The fresh air intake openings 710 penetrate to the left and the right ends 712c3 of the intake air chamber front wall 712c. In addition, bulkheads 714 are formed on the chamber member 712, extending generally along the longitudinal axis of the outboard motor, and located on both sides of the intake air duct 713, outwardly separated from it by desired distance. The bottom wall 712a and the inner face of the upper part of the cowling 700a are connected by the bulkheads 714.

Figure 4:
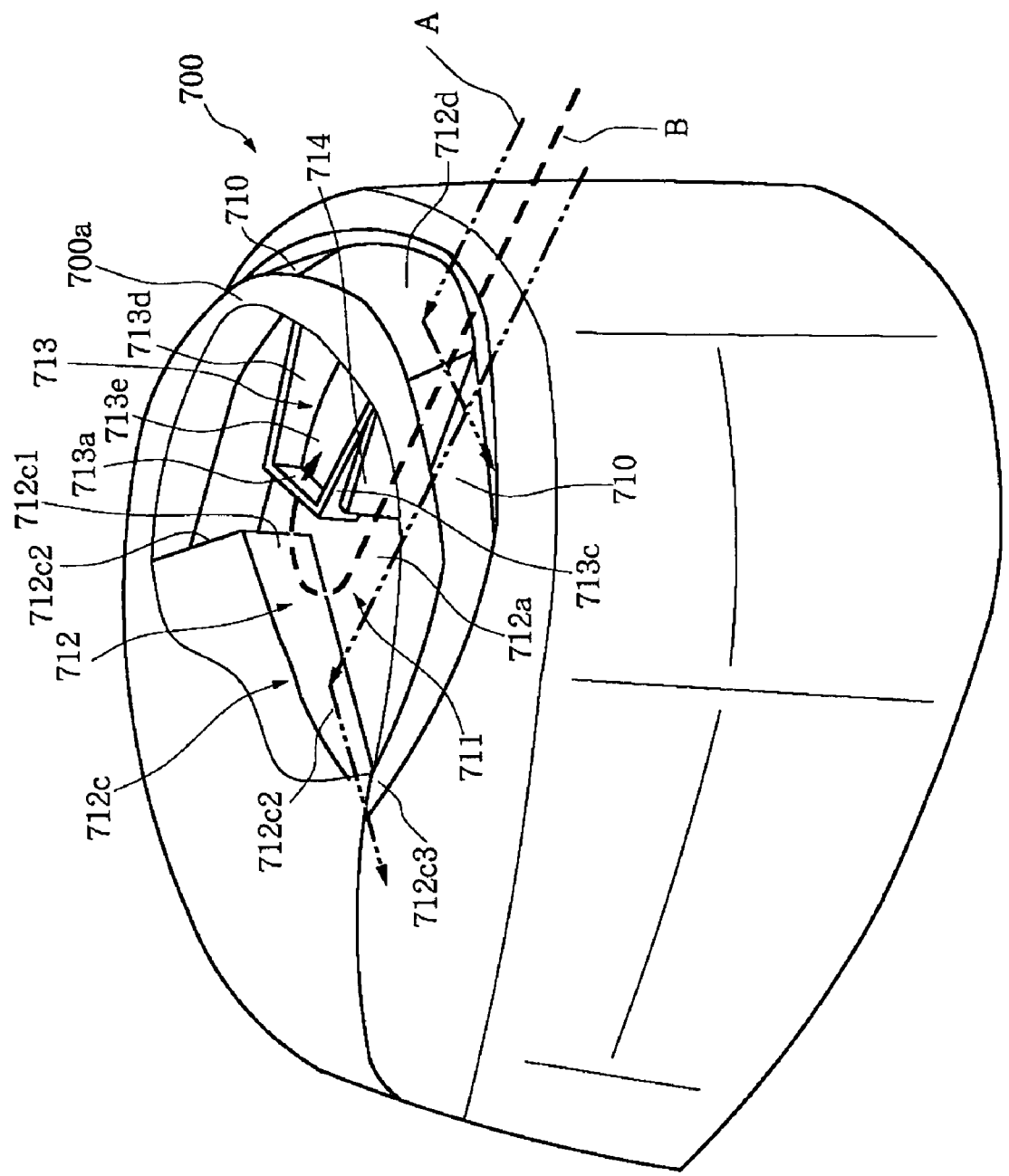
FIG. 4 is a perspective view of an embodiment of a top cowling.
Figure 5:
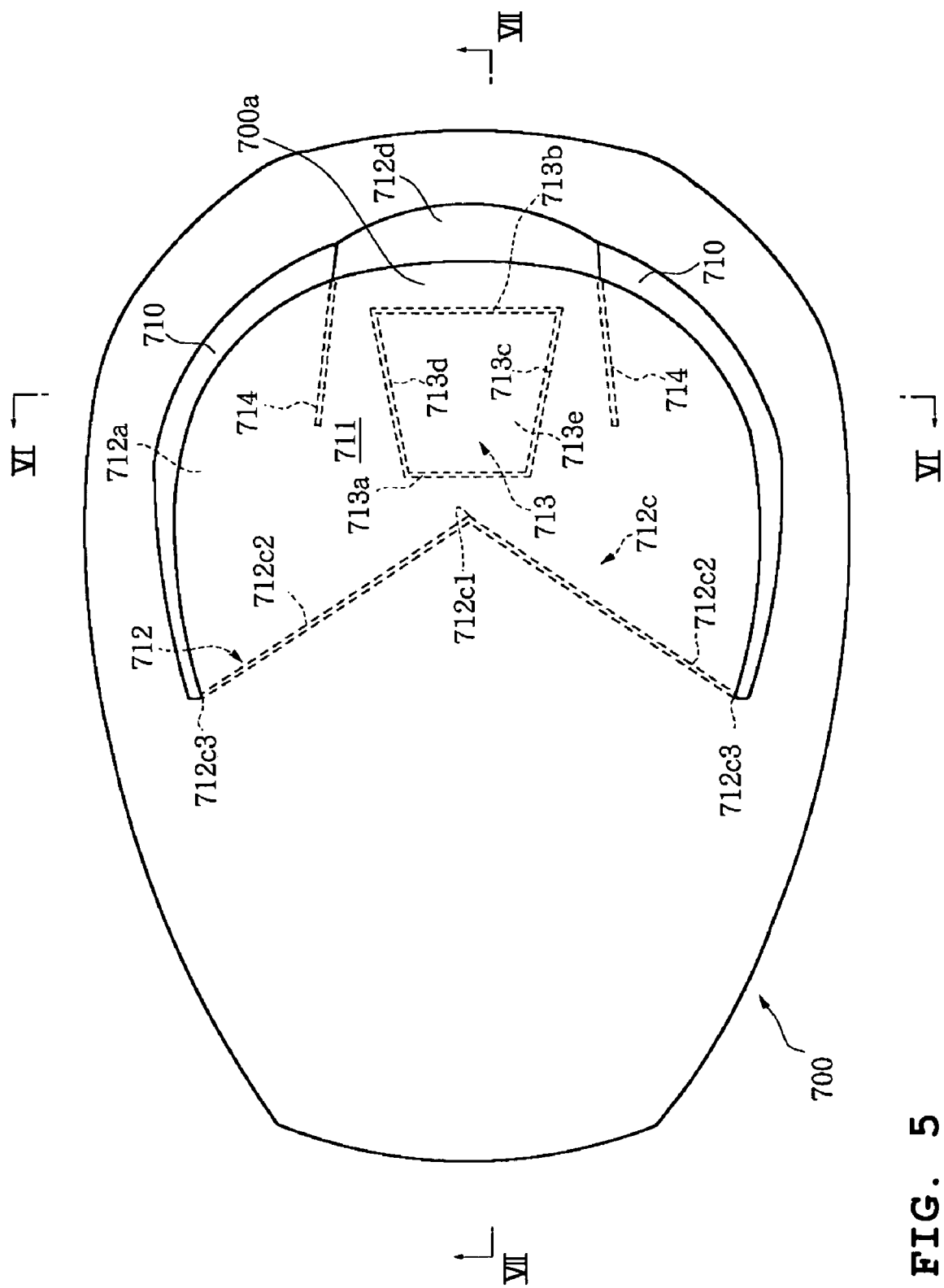
FIG. 5 is a top plan view of the top cowling of FIG. 4.
Figure 6:
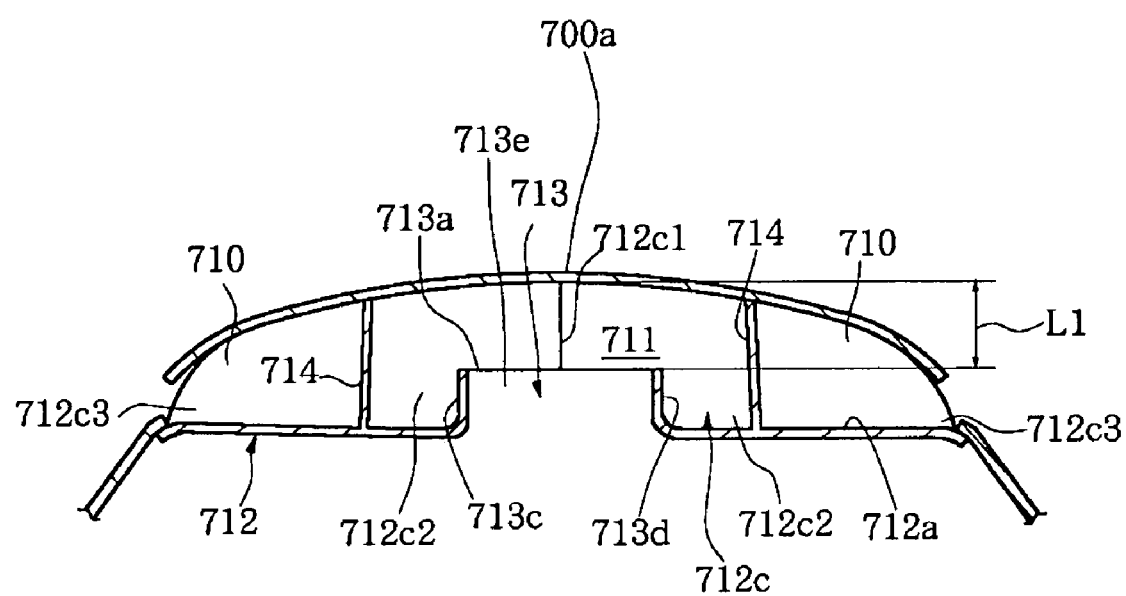
FIG. 6 is a cross-sectional view, taken along the line VI-VI of FIG. 5.
Figure 7:
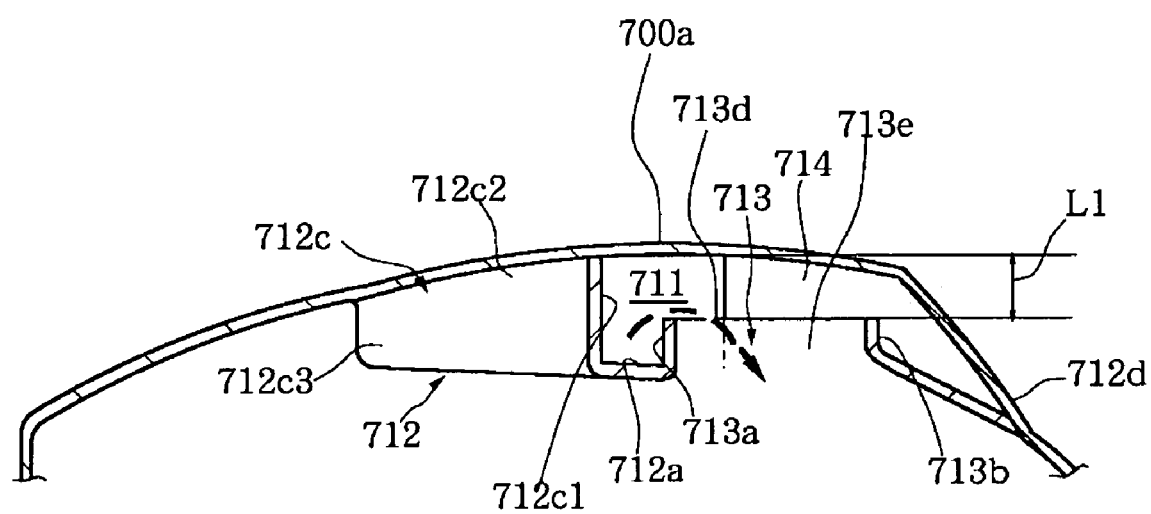
FIG. 7 is a cross-sectional view, taken along the line VII-VII of FIG. 5.

According to this embodiment, water enters the intake air chamber 711 from the left and the right fresh air intake opening 710 when the outboard motor encounters a wave from the rear at the time of deceleration during reverse operation of watercraft. However, as shown in FIG. 4, water is drained off the outboard motor taking the route "A" indicated by the alternate long and two short dashes line arrow, since it is guided by the bulkhead 714 of the molding 712 and the intake air chamber front wall 712c. The air is delivered from the intake air chamber 711 into an engine room 80 through the intake air duct 713 taking the route "B" indicated by the dotted line arrow.

As described above, in the illustrated embodiment, the center portion of the intake air chamber front wall 712c, in the top plan view, projects toward the longitudinally rear part of the outboard motor, generally taking the shape of letter V, and accompanied by inclined faces 712c2 at both sides of the apex. Thus, when water enters from the fresh air intake openings 710 on the right and the left, it hits and the flows along the inclined faces 712c of the intake air chamber front wall 712c, to be drained quickly without substantially changing the direction of flow.

In addition, the bulkheads 714 are provided on both sides of the intake air duct 713, separated outwardly from it by certain distance and extending generally along the longitudinal axis of the outboard motor. The outboard motor can encounter a wave from the rear at an angle when it is steered in the reverse operation, for instance. In such occasion, the bulkheads 714 provided on both sides of the intake air duct 713 can effectively block the water coming into the intake air duct from the rear at an angle.

The bulkheads 714 located on both sides of the intake air duct 713 may be provided to extend from both ends of the rear wall 713b of the intake air duct 713, or from both ends of the wall 712d of the chamber member 712. In addition, provision of the intake air duct 713 generally in the center of the intake air chamber 711 allows effective water separation when water enters the intake air chamber 711 from the rear of the outboard motor.

It is to be understood that, in additional embodiments, intake air chambers having different structural configurations and properties may be employed. Preferably, such intake air chambers include one or more air ducts for directing air into the engine compartment of the outboard motor.

Notwithstanding the effectiveness of an intake air chamber in deflecting water from entering the cowling through the air duct, it is to be expected that at least some water will pass through the air duct, and thus enter the engine compartment. In accordance with a preferred embodiment, and with reference next to FIGS. 2 and 8, a water-draining intake air guide 90 preferably is provided in the cowling 7. This structure prevents water from scattering when it enters the cowling 7 through the intake air duct 713, and instead directs such water away from the engine 10, so as to prevent incoming water from dripping onto the engine 10.

Figure 8:
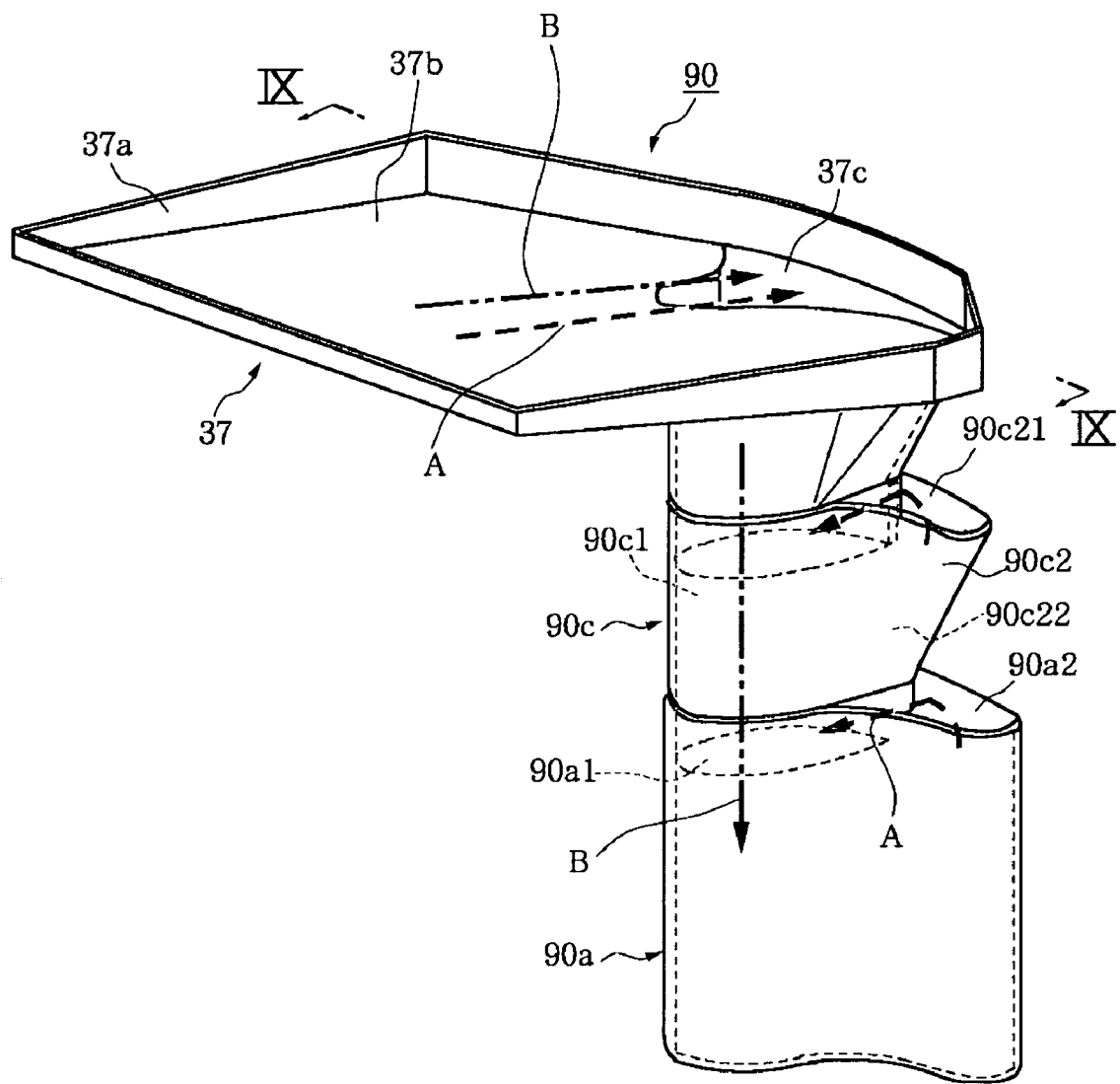
FIG. 8 is a perspective view of an embodiment of a water draining intake air guide.
Figure 9:
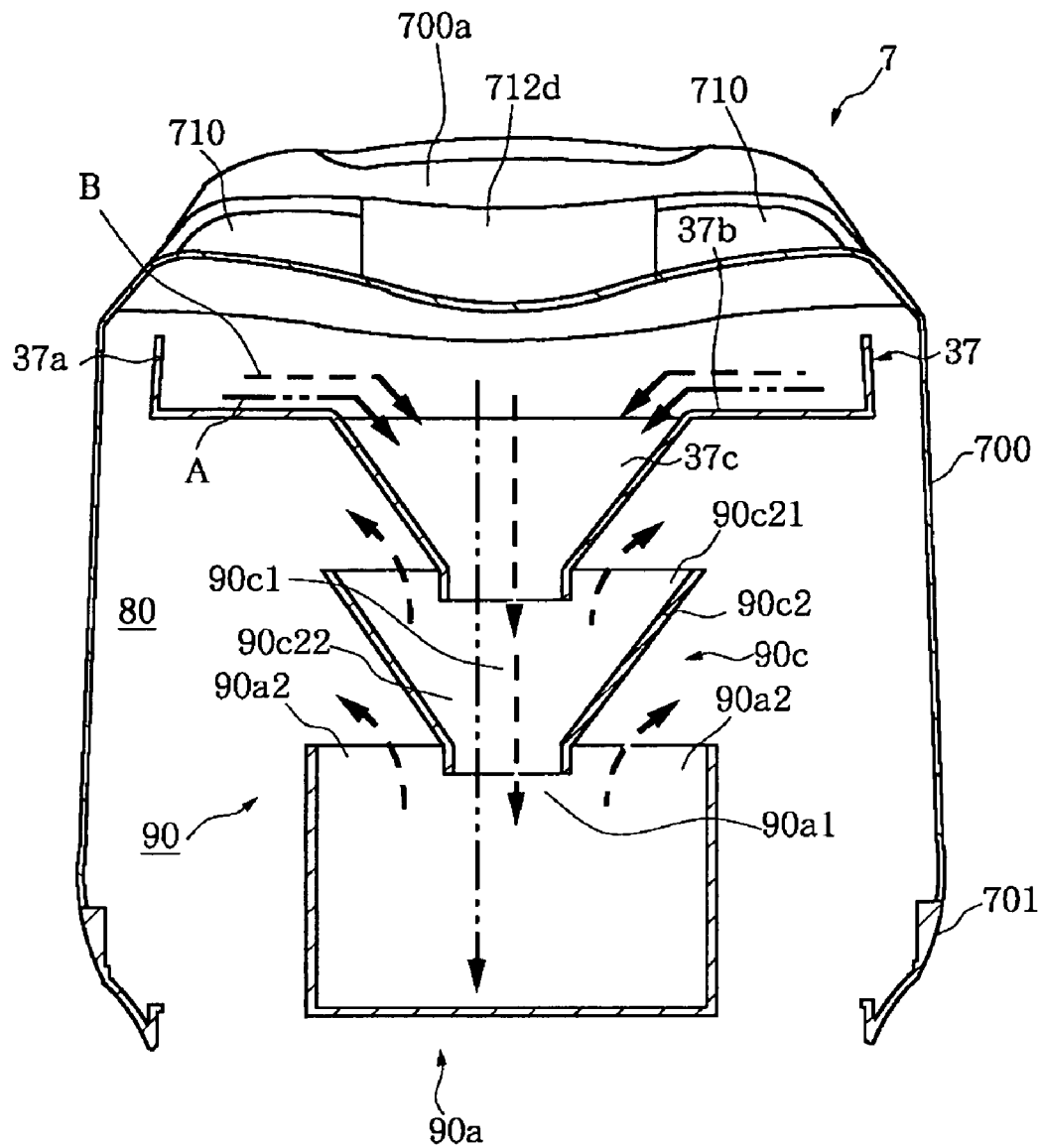
FIG. 9 is a cross-sectional view of the water draining intake air guide taken along line IX-IX of FIG. 8.

With reference to FIGS. 8-9, the water-draining intake air guide 90 preferably comprises a water collecting part 90a, a duct 90c, and the flywheel magneto cover 37. The water collecting part 90a includes a water collecting opening 90a1 and has a specified capacity with a depth sufficient to accumulate water entering the cowling 7. The capacity of the water collecting part 90a is large enough to adequately accumulate and store the amount of water that can be expected to enter the cowling 7 of the outboard motor 1.

The flywheel magneto cover 37 is suitably shaped to collect water, by forming a vertical rib 37a on its periphery, and providing an opening 37c through the bottom face 37b in the longitudinally rear part of the outboard motor. The bottom face 37b preferably tilts rearwardly so that water flows to the opening 37c. Preferably, a duct 37d extends downwardly from the opening 37c.

The duct 90c is disposed between the water collecting opening 90a1 of the water collecting part 90a and the opening 37c of the flywheel magneto cover 37. A water passage 90c1 is formed through the duct 90c, and an air passage 90c2 is formed in communication with the water passage 90c1. The water passage 90c1 preferably runs in a vertical direction, communicating the opening 37c in the flywheel magneto cover 37 with the water collecting opening 90a1 of the water collecting part 90a, to introduce water from the flywheel magneto cover 37 to the water collecting part 90a. An air opening 90c21 preferably is provided at an upper end of the air passage 90c2, and opens upwardly and communicates with the inner space of the cowling 7, while an air opening 90c22 provided at the other end of the air passage 90c2 opens downwardly to communicate with the water passage 90c1, by which the air separated from water flowing through the water passage 90c1 is introduced into the engine room 80. In addition, an air opening 90a2 preferably is provided in the upper portion of the water collecting part 90a to introduce only the air into the engine room 80, as both water and air flow into the water collecting part 90a. Preferably, the air opening 90c21 is disposed vertically above the opening of the duct 37d within duct 90c. Similarly, preferably air opening 90a2 is disposed vertically higher than the opening of the duct 90c within the water collecting part 90a. Of course, it is to be understood that in other embodiments, other arrangements of ducting and air openings can be provided.

In the illustrated embodiment, water-draining intake air guide 90 is disposed inside of the bottom cowling 701, and the water collecting part 90a is provided to accumulate the water that enters the cowling 7. By accumulating the incoming water in the water collecting part 90a, this arrangement can restrain water from spreading over the base of the bottom cowling and being scattered around. As shown in FIG. 2, a bilge pump 91 preferably is disposed on the exhaust guide 11. One end 91a1 of a hose 91a attached to the bilge pump 91 is connected to the water collecting part 90a, so that water accumulated in the water collecting part 90a is drawn out via the bilge pump 91, and is discharged overboard from the other end 91a2 of the hose 91a.

The water passage 90c1 for inducting water to the water collecting part 90a is provided in the duct 90c of the water-draining intake air guide 90. Water entering from the intake air duct 713 is introduced into the water collecting part 90a from the opening 37c of the flywheel magneto cover 37 by way of the water passage 90c1. Thus, the engine 10 is protected from being exposed to water.

Also the air passage 90c2 is attached to the water passage 90c1 to communicate with each other. The water passage 90c1 also works as an intake air passage. The air separated from water in the water passage 90c1 is introduced into the engine room 80 by way of the air passage 90c2. As described above, the water passage 90c1 serves as an intake air passage having water separating function. This arrangement, combined with the water separating structure provided in the intake air chamber 711, assures positive water separation. Further, since the air openings 90c21, 90a2 open in directions that are generally opposite to the vertically downward water flow B, the change in flow direction further helps efficiently separate the air A from the water.

In the embodiment illustrated in FIGS. 8-9, the water passage 90c1 is composed of the duct 90c which communicates the opening 37c on the flywheel magneto cover 37 enclosing the magneto 30 with the water collecting opening 90a1 to take in the water. This structure eliminates the annoyance in such case that water on the water passage 90c1 spills out upon the removal of top cowling. It also reduces the time required hour for manufacturing assembly.

Figure 10:
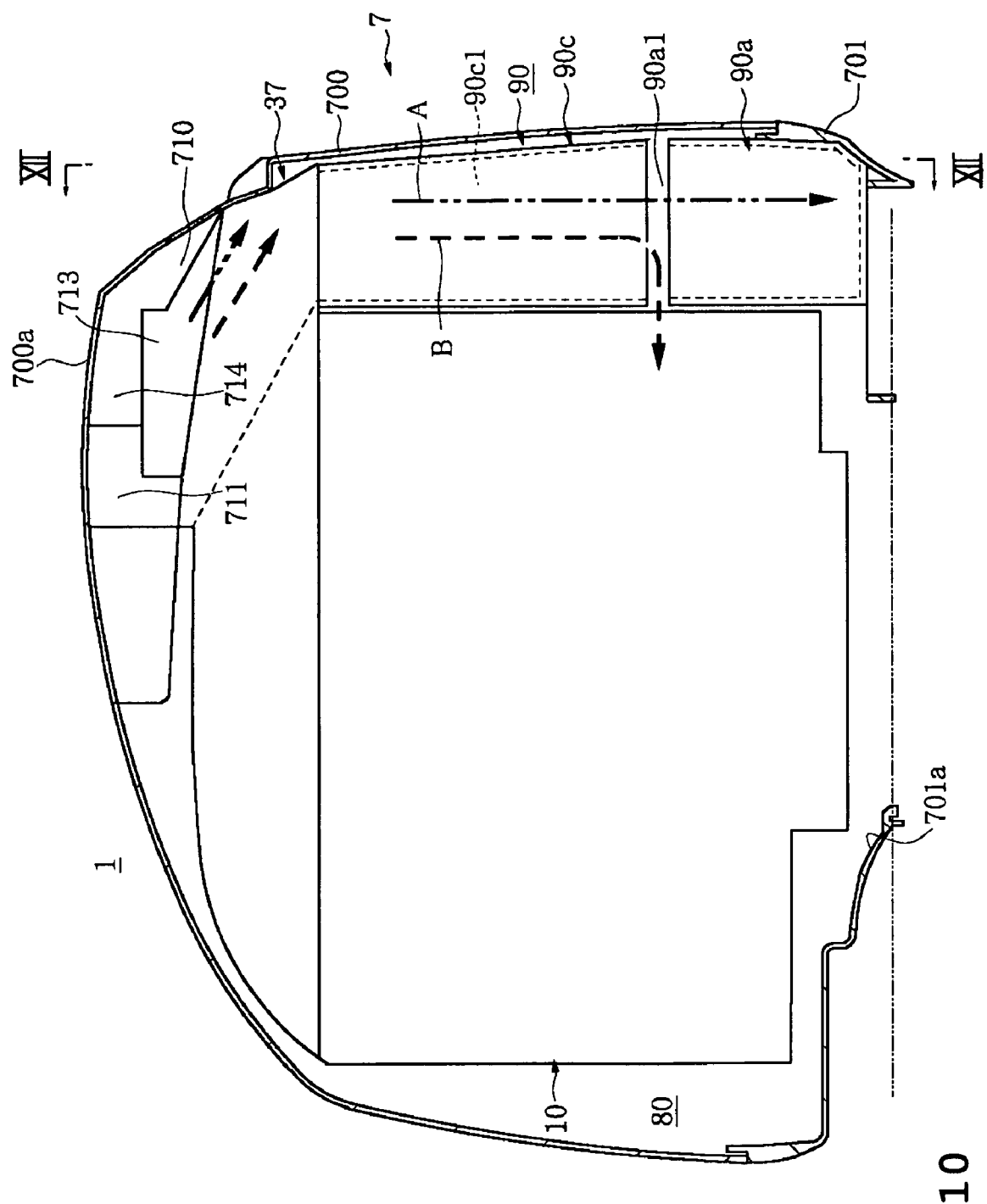
FIG. 10 is a vertical cross-sectional view of another embodiment of an outboard motor.
Figure 11:
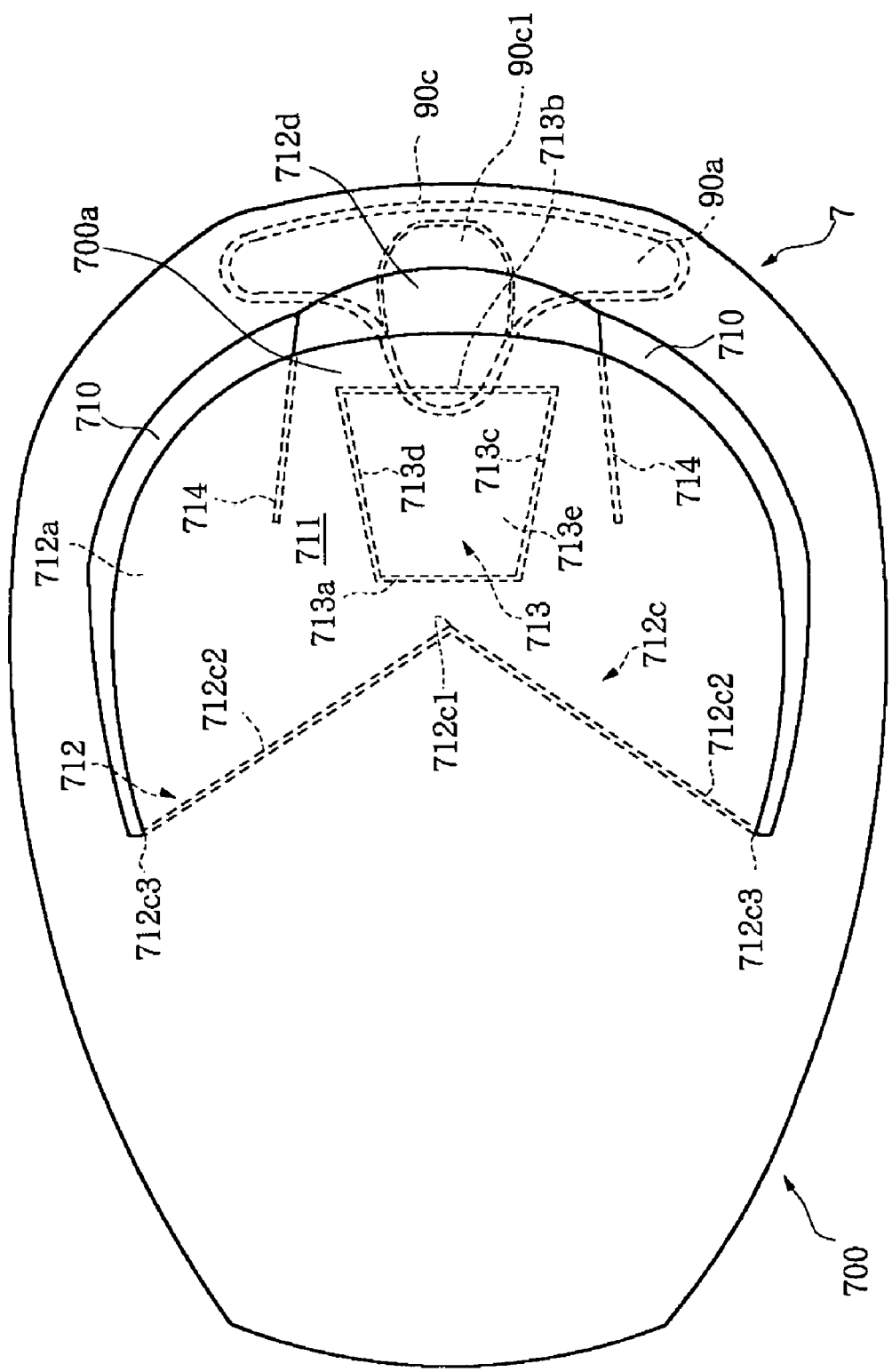
FIG. 11 is a top plan view of the top cowling of the outboard motor of FIG. 10.
Figure 12:
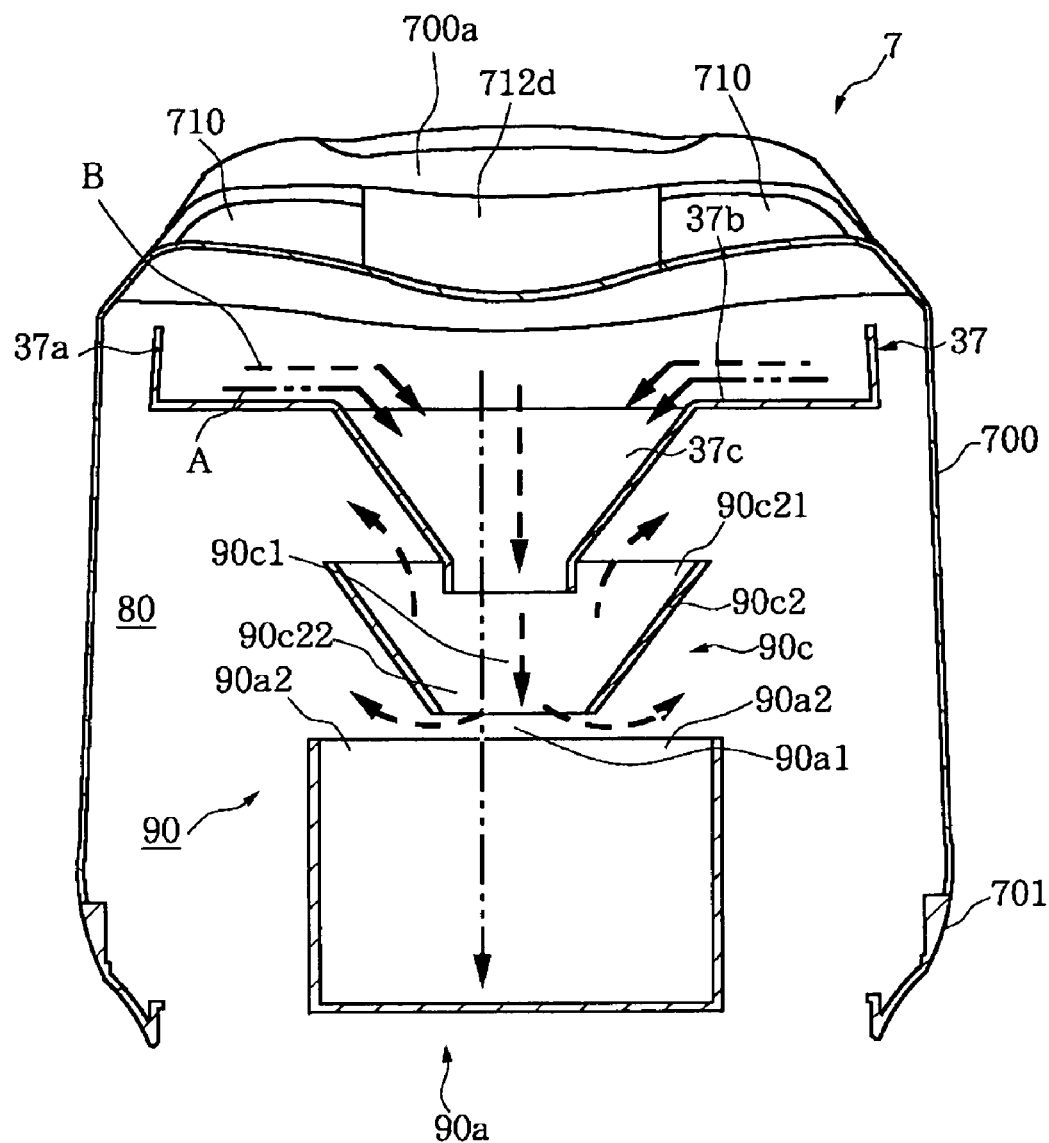
FIG. 12 is a cross-sectional view, taken along the line XII-XII in FIG. 10.

Next, another embodiment of the outboard motor will be described with reference to FIG. 10 through FIG. 12. FIG. 10 is a vertical sectional view of the engine in the outboard motor. FIG. 11 is a top plan view of the top cowling. FIG. 12 is a cross-sectional view, taken along the line XII-XII in FIG. 10. The water-draining intake air guide 90 according to this embodiment has a structure similar to the embodiment shown in FIG. 1 through FIG. 9, except that the water collecting part 90a is provided independently from the duct 90c. The independent water collecting part 90a is disposed inside of the bottom cowling 701. The water passage 90c1 of the duct 90c is in communication with the water collecting opening 90a1 of the water collecting part 90a.

Next, another embodiment of the outboard motor will be described with reference to FIG. 13, which is a vertical cross-sectional view of the outboard motor. The water-draining intake air guide 90 according to this embodiment has a structure sharing some similarities with the embodiment shown in FIG. 1 through FIG. 9, but the water collecting part 90a is provided separately from the duct 90c. The duct 90c is located below the intake air duct 713 of the air intake chamber member 712, and above the water collecting part 90a.

The water coming in from the intake air duct 713 goes through the water passage 90c1 of the duct 90c, drops into the water collecting part 90a and accumulates therein. The air separated from water while going down the water passage 90c1 is led to the inner space of the cowling 7 through the opening at the bottom of the water passage 90c1.

Figure 14:
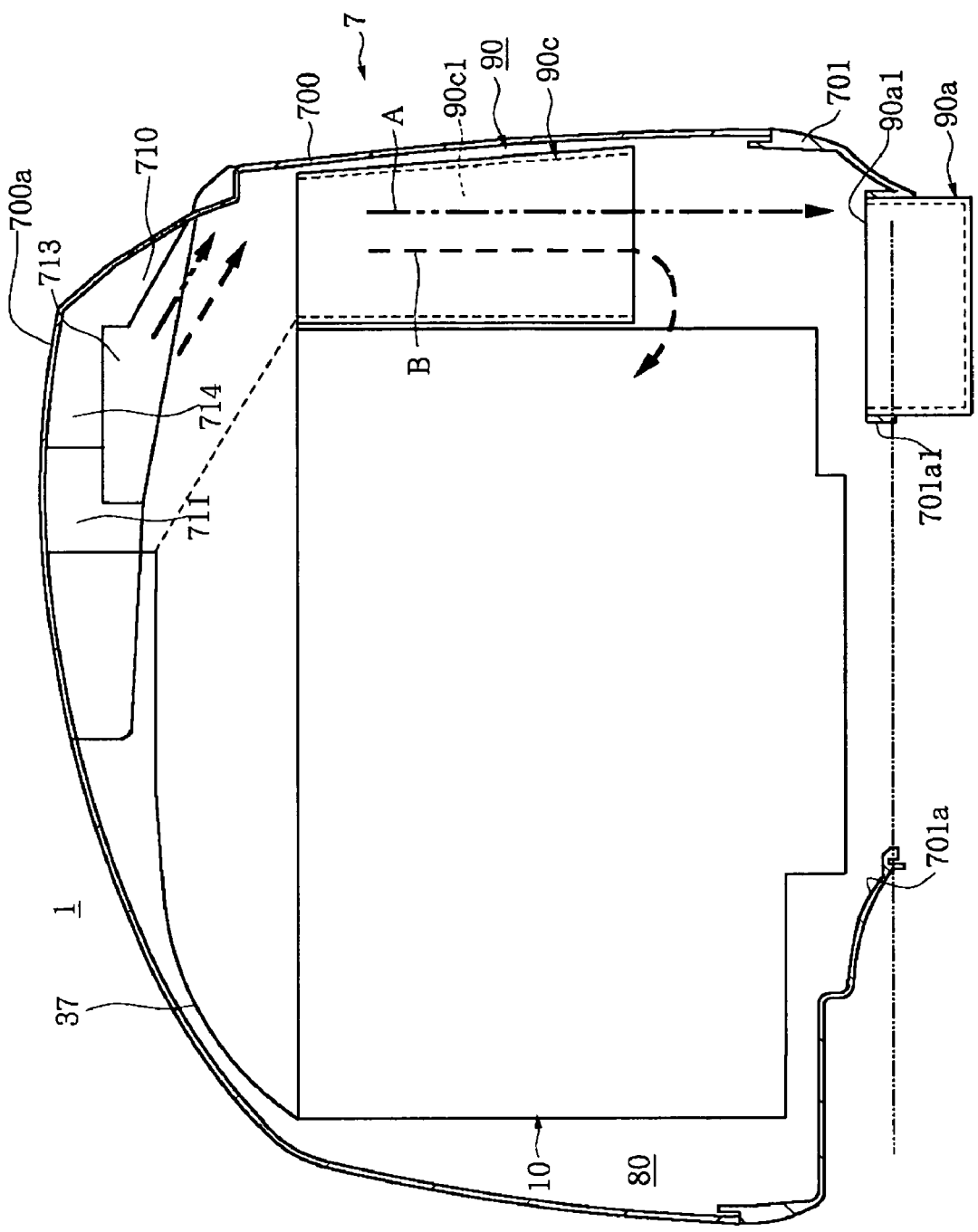
FIG. 14 is a vertical cross-sectional view of a further embodiment of an outboard motor.
Figure 15:
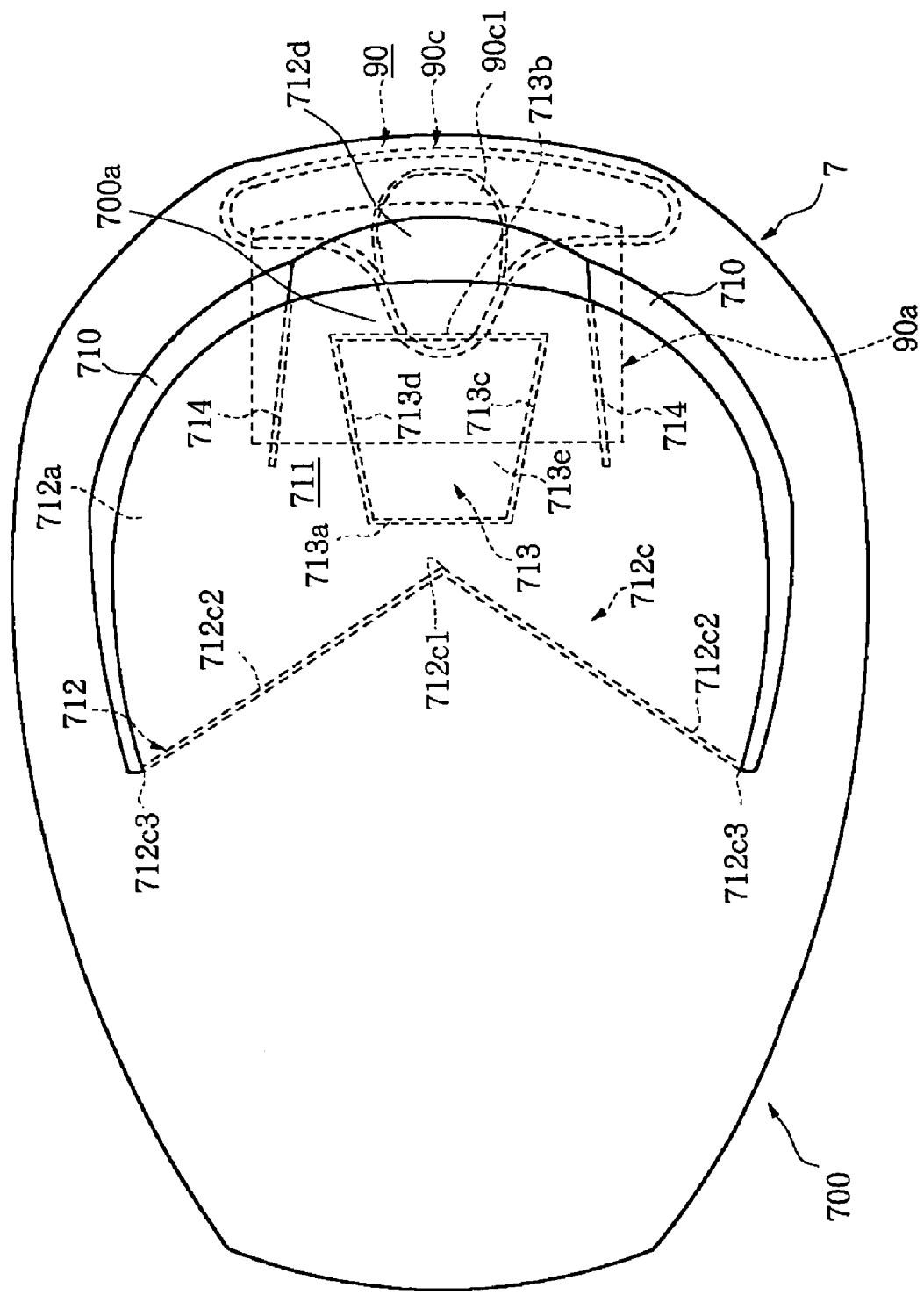
FIG. 15 is a top plan view of the top cowling of the outboard motor of FIG. 14.

Next, another embodiment of the outboard motor will be described with reference to FIGS. 14 and 15. FIG. 14 is a vertical cross-sectional view of the outboard motor. FIG. 15 is a top plan view of the top cowling. The water-draining intake air guide 90 according to this embodiment has a structure similar in some ways to the embodiment shown in FIG. 13. However, the water collecting part 90a is formed in the base 701a of the bottom cowling 701. The water coming in from the intake air duct 713 goes down the water passage 90c1 of the duct 90c and drops into the base 701a of the bottom cowling 701. Such water is accumulated in the water collecting part 90a.

Figure 16:
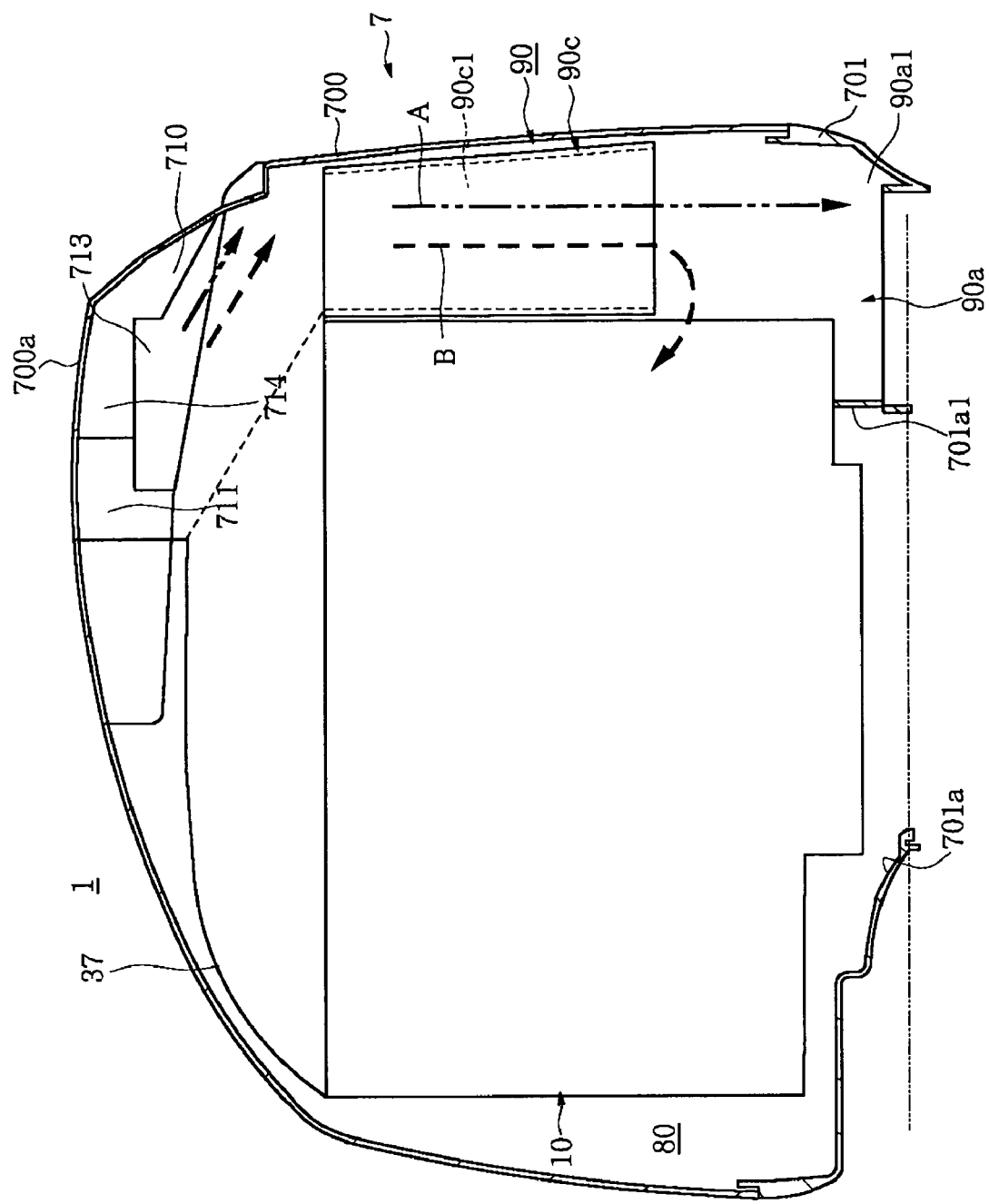
FIG. 16 is a vertical cross-sectional view of a still further embodiment of an outboard motor.
Figure 17:
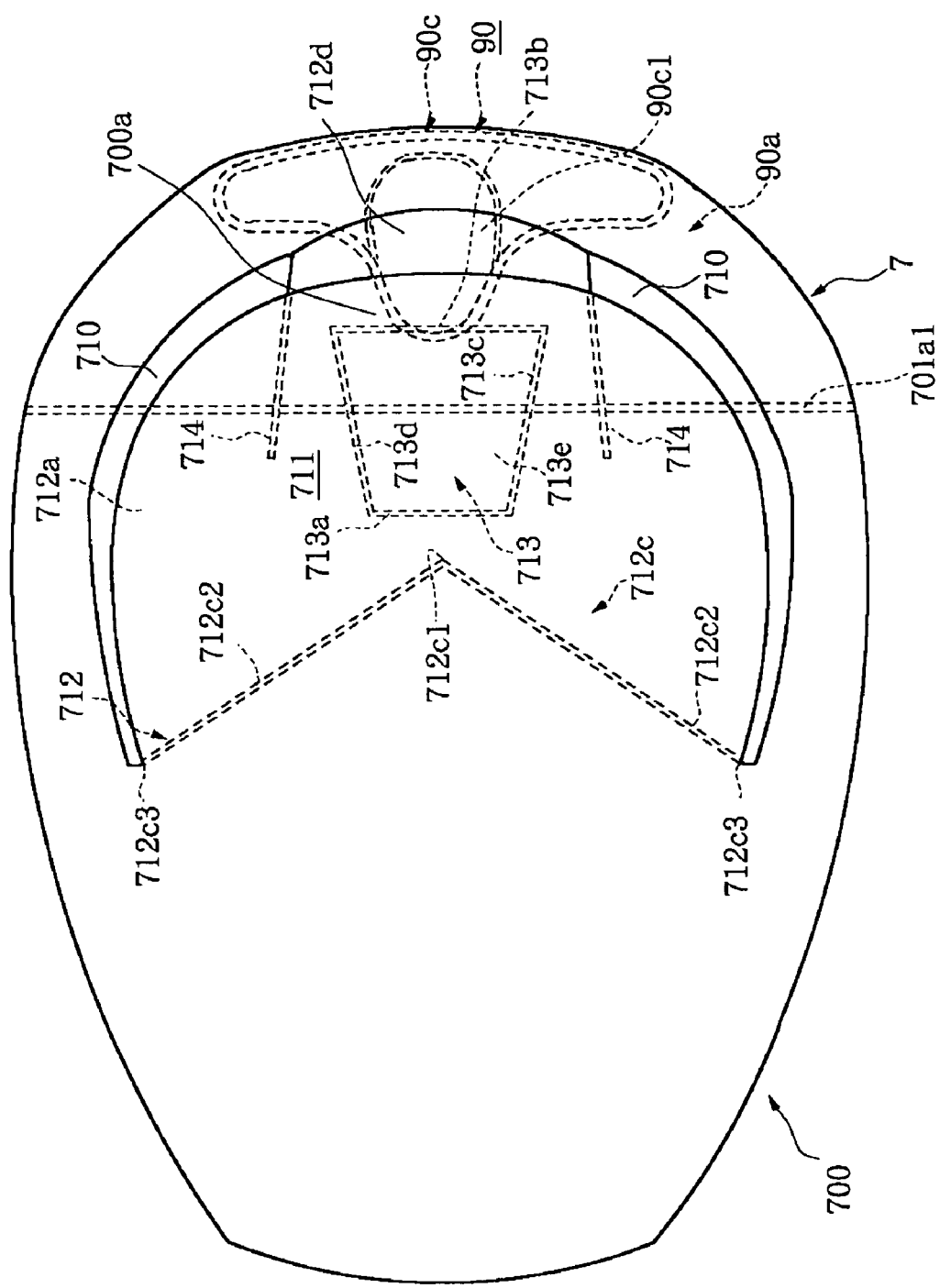
FIG. 17 is a top plan view of the top cowling of the outboard motor of FIG. 16.

Next, another embodiment of the outboard motor will be described with reference to FIGS. 16 and 17. FIG. 16 is a vertical cross-sectional view of the outboard motor. FIG. 17 is a top plan view of the top cowling. The water-draining intake air guide 90 according to this embodiment has a structure similar in some ways to the embodiment shown in FIG. 13. However, the water collecting part 90a is provided in the base 701a of the bottom cowling 701 by means of a vertical rib 701a1. The vertical rib 701a1 preferably extends transversely in the straight line across the longitudinally rear part of the outboard motor. The water collecting part 90a is defined in the longitudinally rear part of the outboard motor behind the vertical rib 701a1.

The water coming-in from the intake air duct 713 goes down the water passage 90c1 of the duct 90c and drops into the base 701a of the bottom cowling 701. Then, the water is accumulated in the water collecting part 90a, which constrains it from flowing freely about the cowling and engine compartments.

Figure 18:
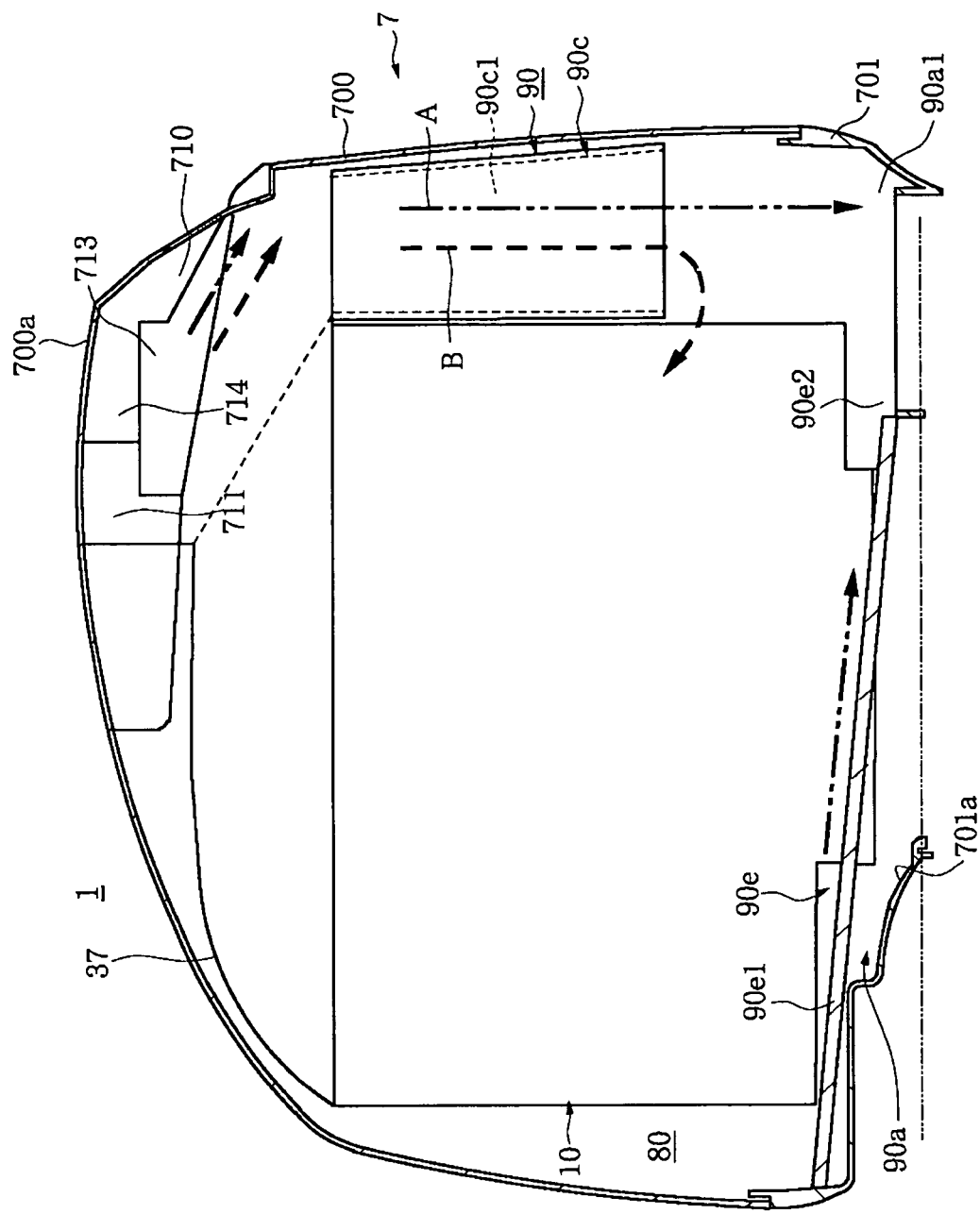
FIG. 18 is a vertical cross-sectional view of another embodiment of an outboard motor.
Figure 19:
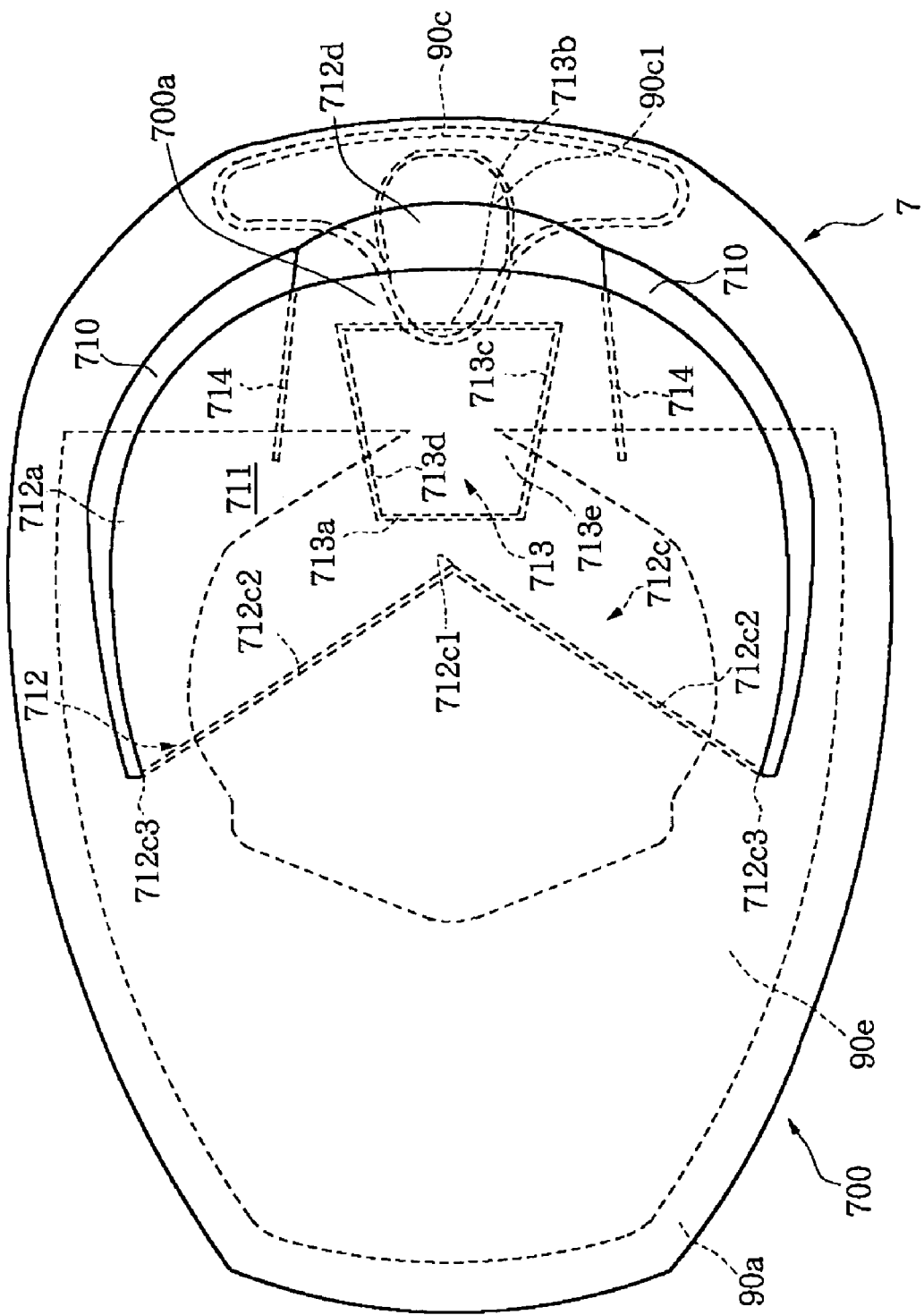
FIG. 19 is a top plan view of the top cowling of the outboard motor of FIG. 18.

Next, another embodiment of the outboard motor will be described with reference to FIGS. 18 and 19. FIG. 18 is a vertical cross-sectional view of the engine in the outboard motor. FIG. 19 is a top plan view of the top cowling. In the water-draining intake air guide 90 according to this embodiment, the water collecting part 90a is provided in the base 701a of the bottom cowling 701. The bottom cowling 701 is machined to form the water collecting part 90a. The water collecting part 90a has a ceiling portion 90e. The ceiling portion 90e, extending to cover the water collecting part 90a, preferably is made of a floor plate 90e1 disposed around the bottom of the engine 10. In other embodiments, the ceiling portion and floor plate may be formed separately.

The water collecting opening 90a1 of the water collecting part 90a preferably is formed in the longitudinally rear part of the outboard motor. The water coming in from the intake air duct 713 goes down the water passage 90c1 of the duct 90c and drops into the base 701a of the bottom cowling 701. Then, the water is accumulated in the water collecting part 90a via the water collecting opening 90a1. The water collecting part 90a has a ceiling portion 90e. The floor plate 90e1 of the ceiling portion 90e extends to cover the water collecting part 90a for positively restraining water from scattering.

Also, the floor plate 90e1 of the ceiling portion 90e preferably is tilted so as to lead the water to the water collecting opening 90a1, and the ceiling portion 90e is shaped to gather water to the water collecting opening 90a of the water collecting part 90a. Thus, the water that has not been introduced into the water collecting part 90a through the duct 90c so far will be led to the water collecting opening 90a1 via the ceiling portion 90e. In the illustrated embodiment, the floor plate 90e1 is a substantially planar plate. It is to be understood, however, that the floor can include 3-dimensional contours that are adapted to guide and direct water toward the water collecting opening 90a1.

In addition, the water collecting part 90a is located in between the inner base area of the bottom cowling 701 and the ceiling portion 90e. Since the water collecting part 90a is formed on the bottom cowling 701, it is easy to adjust the shape of the water collecting part 90a to the engine configuration. For instance, the water collecting part 90a may be provided below the engine, or may take an annular shape that lies around the engine. In addition, it is easier to secure the room for the water collecting part in comparison with the separately provided water collecting part.

A ceiling aperture 90e2 of the ceiling portion 90e is provided in the longitudinally rear part of the outboard motor. When the outboard motor is tilted up, the ceiling aperture 90e2 comes at the elevated position. Thus, the water has less chance to spill out even when the outboard motor is tilted up before the water remaining in the water collecting part 90a is completely drained off.

The structure of water collecting part 90a and the ceiling portion 90e according to this embodiment can be used in combination with the embodiments shown in FIGS. 1 through 17.

Figure 20:
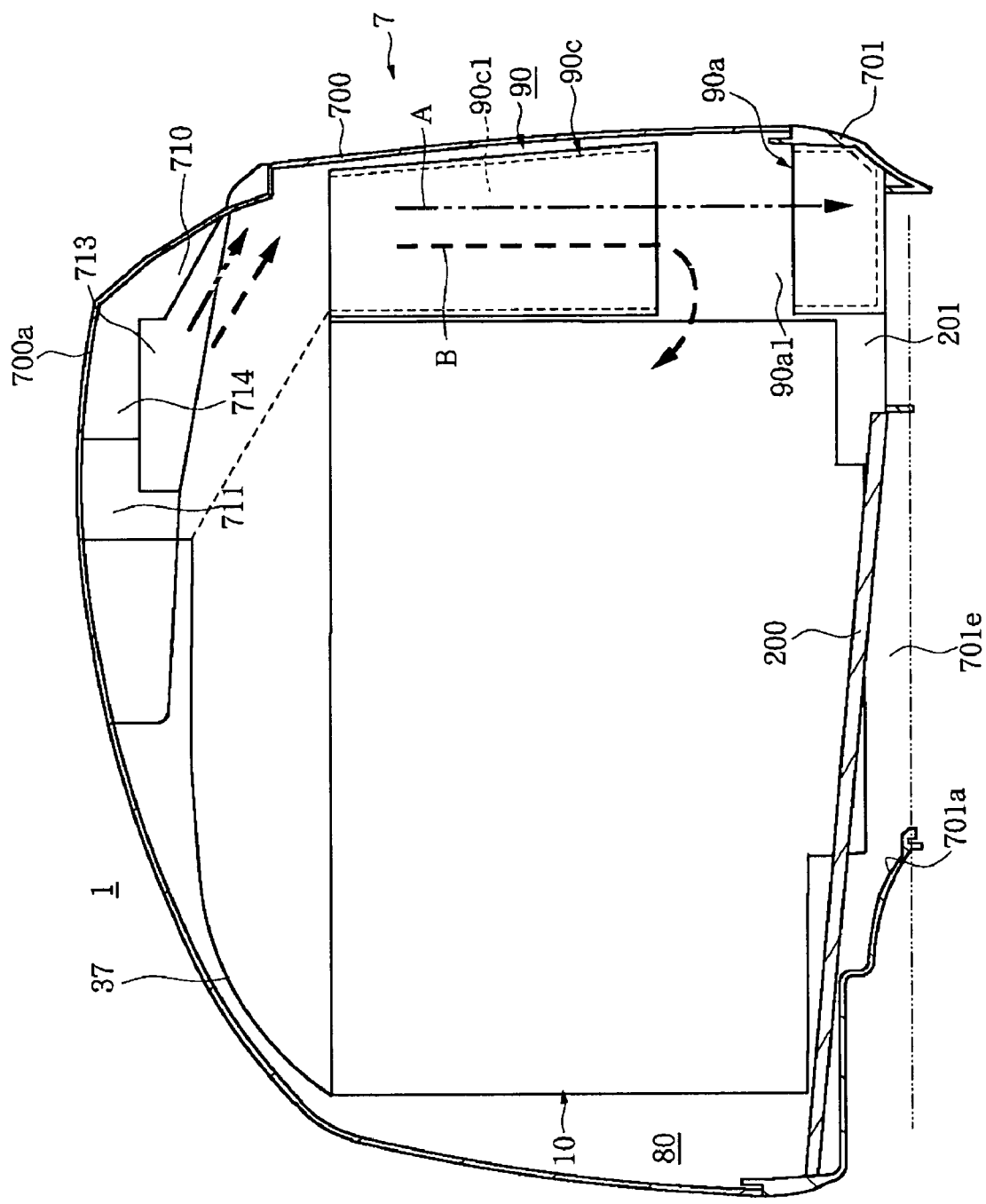
FIG. 20 is a vertical cross-sectional view of still another embodiment of an outboard motor.
Figure 21:
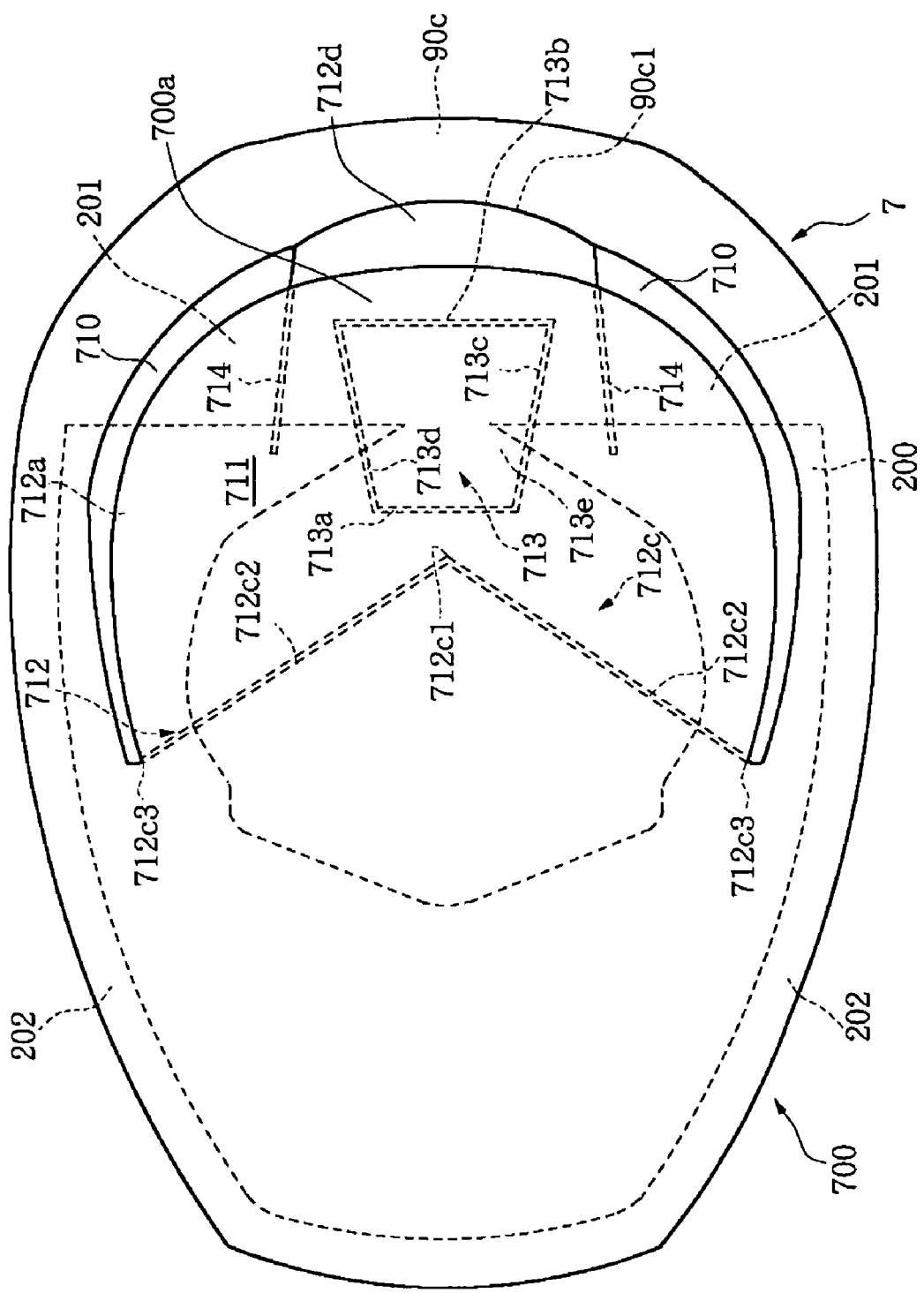
FIG. 21 is a top plan view of the top cowling of the outboard motor of FIG. 20.

Next, another embodiment of the outboard motor will be described with reference to FIGS. 20 and 21. FIG. 20 is a vertical cross-sectional view of the engine in the outboard motor. FIG. 21 is a top plan view of the top cowling.

Figure 13:
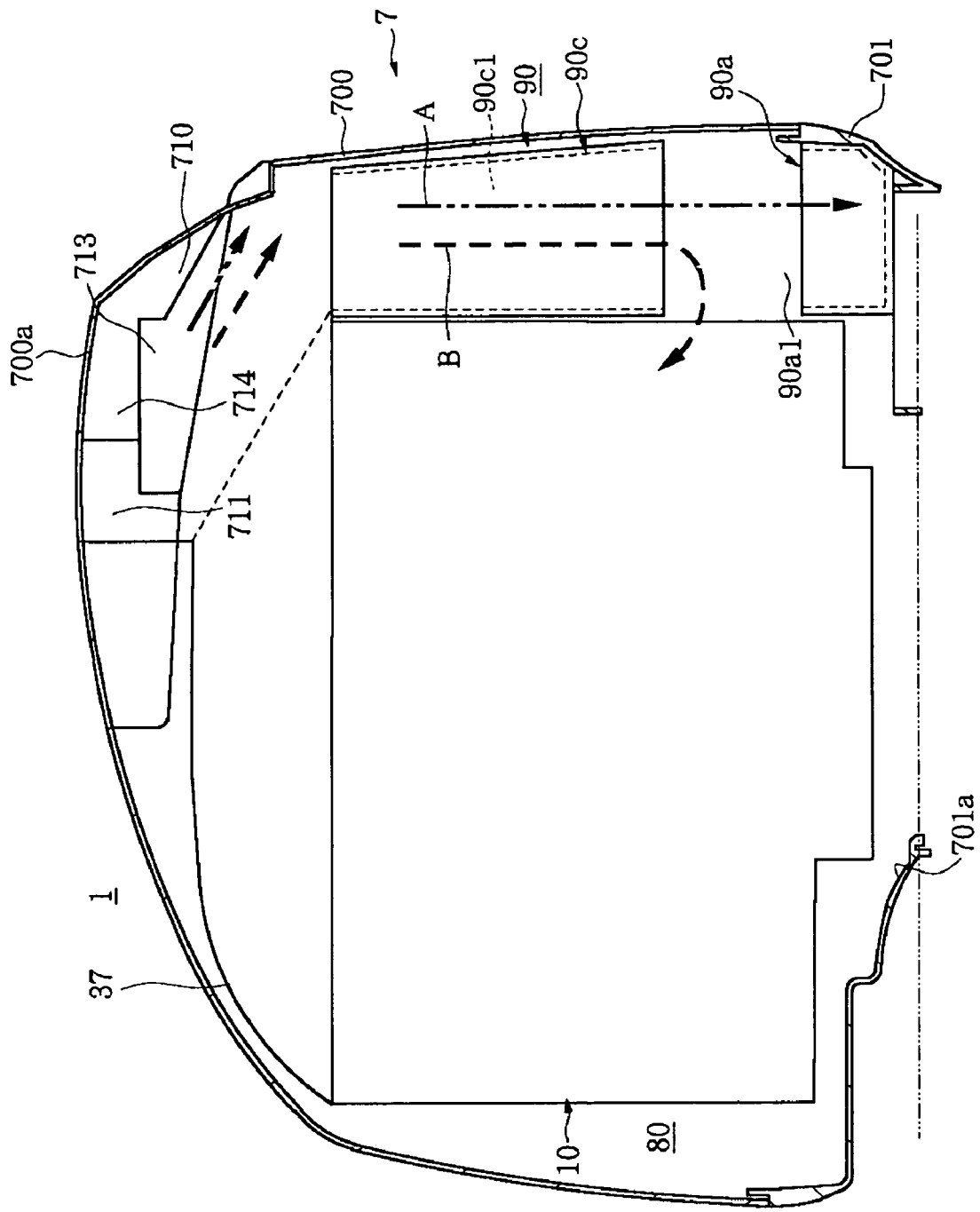
FIG. 13 is a vertical cross-sectional view of still another embodiment of an outboard motor.

The water-draining intake air guide 90 according to this embodiment has a structure similar to the embodiment shown in FIG. 13, except that an anti-scattering plate 200 for preventing the water from scattering is provided on the bottom cowling 701. The anti-scattering plate 200 is disposed around the bottom of the engine 10. The bottom cowling 701 is double-bottomed by the anti-scattering plate 200. A water collecting part 90a is provided in the bottom cowling 701, and structurally the entering water is introduced into the water collecting part 90a. However, there is possibility that some water may spill out of the water collecting part 90a due to the vacuum pressure generated by the engine 10 or vibration. Such spilled water flows into an inner base area 701e of the bottom cowling 701 by way of a gap 201 between the rear end of the anti-scattering plate 200 and the water collecting part 90a, or by way of a gap 202 between the edges of the anti-scattering plate 200 and the sides of the bottom cowling.

Even when water spills out of the water collecting part 90a, and is trapped in the inner base area 701e of the bottom cowling 701 as described above, the water in the inner base area 701e is not scattered around or splashed onto the engine 10 because of the double-bottomed structure by the anti-scattering plate 200 extending to cover the inner base area 701e.

In order to enhance water splash containment in another embodiment, the gap between the edges of the anti-scattering plate 200 and the sides of the bottom cowling is eliminated. As such, the water is trapped in the inner base area 701e of the bottom cowling 701, and the only entry/exit point (other than a drain or pump) is the gap 201 between the rear end of the anti-scattering plate 200 and the water collecting part 90a.

In another embodiment, water trapped in the inner base area 701e of the bottom cowling 701 is drained by a bilge pump (not shown) or other drain means.

Figure 22:
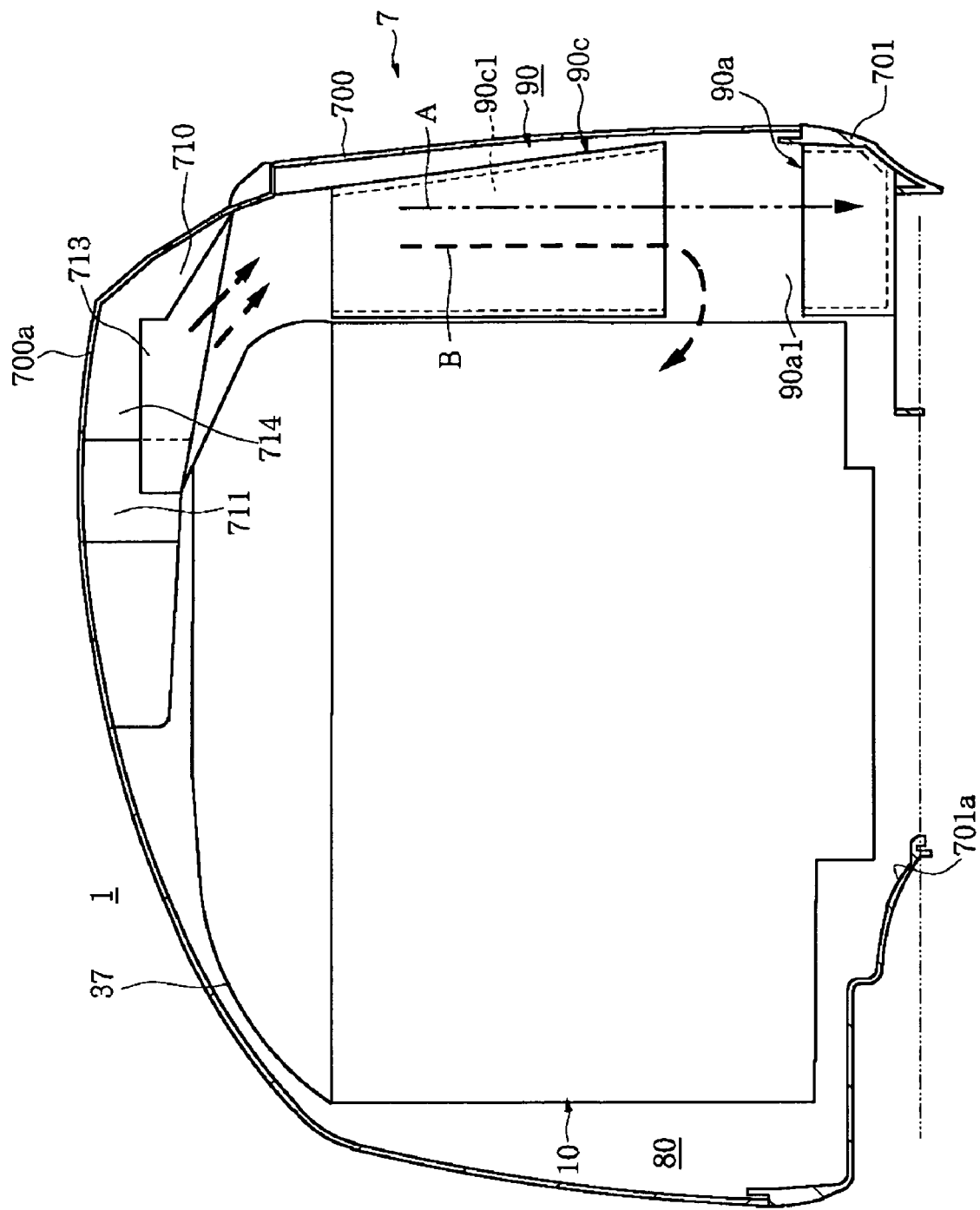
FIG. 22 is a vertical cross-sectional view of another embodiment of an outboard motor.
Figure 23:
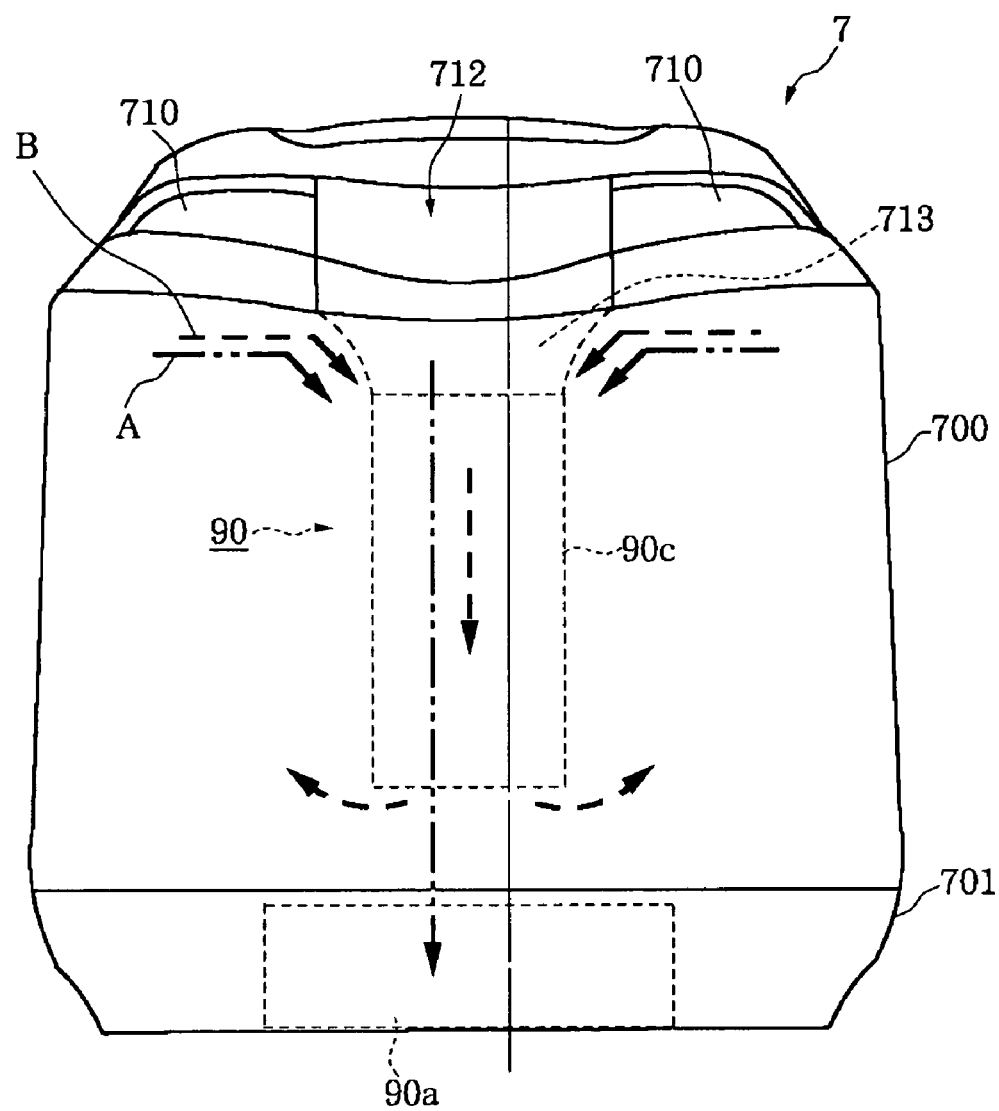
FIG. 23 is a rear view of the top cowling of the outboard motor of FIG. 22.

Next, another embodiment of the outboard motor will be described with reference to FIGS. 22 and 23. FIG. 22 is a vertical cross-sectional view of the outboard motor. FIG. 23 is a rear view of the top cowling.

According to this embodiment, the intake passage communicates directly with the water passage in the duct 90c of the water-draining intake air guide 90 from the intake air duct 713 on the molding 712 independent of the flywheel magneto cover 37. The molding 712 and the duct 90c of the water-draining intake air guide 90 may be formed as the separate components and connected, or may be integrated into one body to serve as the water passage. The structure according to this embodiment can be used in combination with the embodiments described in FIGS. 1 through 21.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. An outboard motor comprising a cowling generally enclosing an engine, the cowling comprising an upper cowling and a lower cowling that engage one another and define an engine compartment therewithin, the upper cowling having an intake assembly defining an intake chamber, an intake aperture formed through the upper cowling and opening into the intake chamber, an air duct opening from the intake chamber into the engine compartment so that intake air is drawn through the intake aperture into the intake chamber and then through the air duct to the engine compartment, and a water collector disposed in the lower cowling, the water collector having an opening and being adapted to accumulate water from within the engine compartment, wherein the air duct comprises an elongate passage having a first end communicating with the intake chamber and a second end generally aligned with the water collector opening, the passage adapted to direct water and air from the intake chamber toward the water collector opening, and an air outlet is formed through the passage between the first and second ends, the air outlet communicating with the engine compartment.

2. The outboard motor of claim 1, wherein the water collector comprises a plurality of side walls, and has a depth sufficient to resist splashing of the water through the opening during motor operation.

3. The outboard motor of claim 2 additionally comprising a pump adapted to pump water out of the water collector.

4. The outboard motor of claim 1, wherein the air outlet opens in a direction generally transverse to a direction of water flow through the passage.

5. The outboard motor of claim 4, wherein the passage is directed generally downwardly, and the air outlet opens generally upwardly.

6. The outboard motor of claim 4, wherein the second end of the passage is spaced from the water collector opening.

7. The outboard motor of claim 4, wherein the second end of the passage generally engages the water collector opening.

8. The outboard motor of claim 4, wherein the passage comprises a plurality of passage members attached together.

9. The outboard motor of claim 8, wherein the passage comprises an upstream passage member and a downstream passage member that are disposed adjacent one another, and an upstream portion of the downstream passage member overlaps a downstream portion of the upstream passage member.

10. The outboard motor of claim 1, wherein the elongate passage is generally tubular.

11. An outboard motor comprising a cowling generally enclosing an engine, the cowling comprising an upper cowling and a lower cowling that engage one another and define an engine compartment therewithin, the upper cowling having an intake assembly defining an intake chamber, an intake aperture formed through the upper cowling and opening into the intake chamber, an air duct opening from the intake chamber into the engine compartment so that intake air is drawn through the intake aperture into the intake chamber and then through the air duct to the engine compartment, and a water collector disposed in the lower cowling, the water collector having an opening and being adapted to accumulate water from within the engine compartment, wherein the water collector comprises a ceiling portion adapted to prevent water from splashing out of the water collector during motor operation.

12. The outboard motor of claim 11 wherein the lower cowling additionally comprises a floor portion of the engine compartment, the floor portion adapted to direct water flow toward the water collector opening.

13. The outboard motor of claim 12, wherein the floor portion and ceiling portion are unitarily formed.

14. The outboard motor of claim 12, wherein the water collector opening is arranged generally in a rear portion of the cowling.

15. An outboard motor comprising a cowling generally enclosing an engine, the cowling comprising an upper cowling and a lower cowling that engage one another and define an engine compartment therewithin, the upper cowling having an intake assembly defining an intake chamber, an intake aperture formed through the upper cowling and opening into the intake chamber, an air duct opening from the intake chamber into the engine compartment so that intake air is drawn through the intake aperture into the intake chamber and then through the air duct to the engine compartment, the engine comprising a flywheel cover disposed at an upper portion of the engine and arranged below the air duct opening so that water that passes through the air duct is directed toward the flywheel cover, the flywheel cover comprising an opening, an upper surface of the flywheel cover adapted to direct water flow toward the opening, and a water collector disposed in the lower cowling, the water collector having an opening and being adapted to accumulate water from within the engine compartment.

16. The outboard motor of claim 15, wherein the flywheel cover opening is generally aligned with a passage that extends toward the water collector opening so that water entering the engine compartment through the air duct contacts the flywheel cover and is directed to the flywheel cover opening then to the passage and further to the water collector.

17. The outboard motor of claim 16, wherein a portion of the water passage extends through the water collector opening.

18. The outboard motor of claim 16, wherein the water collector has a bottom surface and a splash guard spaced from the bottom surface, the splash guard adapted to be disposed between the engine and water in the water collector.

19. The outboard motor of claim 18, wherein the splash guard comprises a plate.

20. An outboard motor comprising a cowling generally enclosing an engine, the cowling comprising an upper cowling member and a lower cowling member that engage one another and define an engine compartment, the upper cowling member having an air intake assembly adapted to direct air from outside the cowling into the engine compartment, the lower cowling member comprising means for holding water that may enter the engine compartment, the outboard motor additionally comprising means for directing water from the air intake system toward the water holding means, and a barrier arranged between the water holding means and the engine for inhibiting water splashing from the water holding means.

21. The outboard motor of claim 20 additionally comprising means for collecting water within the engine compartment.

22. The outboard motor of claim 21, wherein the water collecting means directs water into the water holding means.

* * * * *